(12) United States Patent
Aminaka et al.

(10) Patent No.: US 9,516,539 B2
(45) Date of Patent: Dec. 6, 2016

(54) RADIO STATION AND METHOD OF PROCESSING USER DATA WITH RADIO STATION

(71) Applicants: Hiroaki Aminaka, Tokyo (JP); Kojiro Hamabe, Tokyo (JP)

(72) Inventors: Hiroaki Aminaka, Tokyo (JP); Kojiro Hamabe, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 14/360,915

(22) PCT Filed: Oct. 3, 2012

(86) PCT No.: PCT/JP2012/006346
§ 371 (c)(1),
(2) Date: May 27, 2014

(87) PCT Pub. No.: WO2013/076898
PCT Pub. Date: May 30, 2013

(65) Prior Publication Data
US 2014/0328184 A1 Nov. 6, 2014

(30) Foreign Application Priority Data
Nov. 25, 2011 (JP) .................................. 2011-257478

(51) Int. Cl.
*H04W 28/02* (2009.01)
*H04L 5/00* (2006.01)
(Continued)

(52) U.S. Cl.
CPC ........ *H04W 28/0205* (2013.01); *H04L 5/0032* (2013.01); *H04L 25/00* (2013.01);
(Continued)

(58) Field of Classification Search
CPC ........ H04L 5/003; H04L 5/0032; H04L 25/00; H04W 4/06; H04W 72/1263; H04W 72/1252; H04W 72/1257; H04W 36/22; H04W 52/0216; H04H 20/67
See application file for complete search history.

(56) References Cited

U.S. PATENT DOCUMENTS 8,050,296 B2 * 11/2011 Osterling .............. H04J 3/0638
370/278
2003/0189915 A1 10/2003 Miller
(Continued)

FOREIGN PATENT DOCUMENTS

CN 102158461 A 8/2011
EP 1713290 A1 10/2006
(Continued)

OTHER PUBLICATIONS

Ericsson AB, Huawei Technologies Co. Ltd, NEC Corporation, Alcatel Lucent and Nokia Siemens Networks GmbH & Co. KG, Common Public Radio Interface (CPRI); Interface Specification, V5.0, Sep. 21, 2011.*
(Continued)

*Primary Examiner* — Chi H Pham
*Assistant Examiner* — Shailendra Kumar
(74) *Attorney, Agent, or Firm* — Wilmer Cutler Pickering Hale and Dorr LLP

(57) ABSTRACT

A radio station (1) includes a first part (1A) and a second part (1B). The second part (1B) can be arranged so as to be physically separated from the first part (1A) and is connected to the first part (1A) via a transmission line (40) so as to be able to communicate with the first part. The first part (1A) includes a first scheduling unit (20A) capable of performing dynamic scheduling to allocate a plurality of radio resources to a plurality of mobile stations or user data. The second part (1B) includes a second scheduling unit
(Continued)

(20B) capable of performing, instead of the first scheduling unit (20A), at least a part of dynamic scheduling for a first mobile station connected to the second part (1B) among the plurality of mobile stations.

18 Claims, 18 Drawing Sheets

(51) Int. Cl.
    *H04W 36/22*     (2009.01)
    *H04W 52/02*     (2009.01)
    *H04L 25/00*     (2006.01)
    *H04W 72/12*     (2009.01)

(52) U.S. Cl.
    CPC ....... *H04W 36/22* (2013.01); *H04W 52/0206* (2013.01); *H04W 52/0216* (2013.01); *H04W 72/1252* (2013.01); *H04W 28/0236* (2013.01)

(56) References Cited

U.S. PATENT DOCUMENTS

| | | | |
|---|---|---|---|
| 2005/0096054 A1 | 5/2005 | Zhang et al. | |
| 2005/0141477 A1 | 6/2005 | Tomita et al. | |
| 2005/0255823 A1 | 11/2005 | Zhang et al. | |
| 2006/0142021 A1 | 6/2006 | Mueckenheim et al. | |
| 2006/0251030 A1 | 11/2006 | Anderson et al. | |
| 2007/0073895 A1 | 3/2007 | Sebire et al. | |
| 2007/0184840 A1 | 8/2007 | Zhang et al. | |
| 2008/0101257 A1 | 5/2008 | Cheng et al. | |
| 2010/0195544 A1 | 8/2010 | Anderson et al. | |
| 2011/0065396 A1* | 3/2011 | Hirata ............... 455/77 | |
| 2011/0128950 A1* | 6/2011 | Tomita ............. H04W 92/12 370/339 | |
| 2011/0158332 A1* | 6/2011 | Wu ............ H04W 88/08 375/259 | |
| 2011/0171944 A1 | 7/2011 | Kobayashi et al. | |
| 2011/0235564 A1* | 9/2011 | Watanabe ........... H04W 72/005 370/312 | |
| 2012/0057548 A1 | 3/2012 | Hasegawa | |
| 2012/0263068 A1* | 10/2012 | Morimoto ............ H04W 24/10 370/252 | |
| 2013/0017852 A1* | 1/2013 | Liu .................... H04W 88/085 455/509 | |
| 2013/0272213 A1* | 10/2013 | Manssour .......... H04W 72/121 370/329 | |
| 2013/0329698 A1 | 12/2013 | Miller | |

FOREIGN PATENT DOCUMENTS

| | | |
|---|---|---|
| EP | 1677564 B1 | 1/2008 |
| EP | 1880566 B1 | 8/2009 |
| EP | 2299758 A2 | 3/2011 |
| EP | 1545143 B1 | 6/2011 |
| EP | 1680865 B1 | 6/2011 |
| EP | 2328382 A1 | 6/2011 |
| EP | 2373069 A2 | 10/2011 |
| EP | 2479929 A1 | 7/2012 |
| EP | 2525623 A2 | 11/2012 |
| EP | 2672743 A1 | 12/2013 |
| JP | 2006-191592 A | 7/2006 |
| JP | 2007-503173 A | 2/2007 |
| JP | 2007-511136 A | 4/2007 |
| JP | 2008-099306 A | 4/2008 |
| JP | 2008099309 A * | 4/2008 |
| JP | 2008-541523 A | 11/2008 |
| JP | 2009-510874 A | 3/2009 |
| JP | 2011-066593 A | 3/2011 |
| JP | 2011-114689 A | 6/2011 |
| JP | 2011-142516 A | 7/2011 |
| JP | 2011-211325 A | 10/2011 |
| WO | WO-2004/030396 A1 | 4/2004 |
| WO | WO-2004/095861 A1 | 11/2004 |
| WO | WO-2005/020597 A2 | 3/2005 |
| WO | WO-2005/048465 A2 | 5/2005 |
| WO | WO-2006/117251 A1 | 11/2006 |
| WO | WO-2007/036790 A1 | 4/2007 |
| WO | WO-2010/038287 A1 | 4/2010 |
| WO | WO-2011/083797 A1 | 7/2011 |
| WO | WO-2011/127855 A2 | 10/2011 |

OTHER PUBLICATIONS

Common Public Radio Interface (CPRI) Specification V5.0 (Sep. 21, 2011), Ericsson AB, Huawei Technologies Co. Ltd, NEC Corporation, Alcatel Lucent and Nokia Siemens Networks GmbH & Co. KG, pp. 1-119 (Sep. 21, 2011).

Common Public Radio Interface (CPRI) Specification V4.2 (Sep. 29, 2010), [online], Sep. 2010, Ericsson AB, Huawei Technologies Co. Ltd, NEC Corporation, Alcatel Lucent and Nokia Siemens Networks GmbH & Co. KG, [retrieved on Oct. 20, 2011], Internet <URL:http://www.cpri.info/spec.html> ( pp. 1-113).

International Search Report corresponding to International Application No. PCT/JP2012/006365, Dec. 18, 2012, 2 pages.

International Search Report corresponding to International Application No. PCT/JP2012/006366, Dec. 18, 2012, 2 pages.

International Search Report corresponding to International Application No. PCT/JP2012/006367, Dec. 18, 2012, 2 pages.

International Search Report corresponding to International Application No. PCT/JP2012/006346, Jan. 15, 2013, 3 pages.

Chttl, HTC et al., "Views on heterogeneous deployment scenarios with distributed RRHs," 3GPP TSG RAN WG1 Meeting #64, R1-111006, Taipei, Taiwan, 3 pages (Feb. 21-25, 2011).

Extended European Search Report issued by the European Patent Office for Application No. 12851877.6 dated Sep. 28, 2015 (7 pages).

Extended European Search Report corresponding to European Application No. 12851052.6, dated Jul. 23, 2015, 6 pages.

Extended European Search Report corresponding to European Application No. 12851142.5, dated Aug. 12, 2015, 7 pages.

* cited by examiner

RADIO STATION AND METHOD OF PROCESSING USER DATA WITH RADIO STATION

CROSS-REFERENCE TO RELATED APPLICATIONS

This application is a national stage application of International Application No. PCT/JP2012/006346 entitled "Wireless Station and Method of Processing User Data with Wireless Station," filed on Oct. 3, 2012, which claims the benefit of the priority of Japanese Patent Application No. 2011-257478, filed on Nov. 25, 2011, the disclosures of each of which are hereby incorporated by reference in their entirety.

The present invention relates to a configuration of a radio station (e.g., a radio base station, a relay station) used in a radio communication network.

BACKGROUND ART

A structure of a radio base station including a radio equipment controller (REC) and a radio equipment (RE), which are separated from each other, is disclosed in Patent Literature 1 and Non-Patent Literature 1. The REC and the RE are at least functionally separated from each other. The REC and the RE are connected to each other through an internal interface (communication interface) of the radio base station. The REC and the RE may be arranged so as to be physically spaced apart from each other. In a typical layout, the REC is arranged in a main building of a telecom carrier and the RE is arranged at a remote location near an antenna.

The REC is connected to an upper network (e.g., a core network of a telecom carrier). The REC plays a role in controlling and monitoring the entire radio base station and performing digital baseband signal processing. In this case, the digital baseband signal processing includes layer-2 signal processing and layer-1 (physical layer) signal processing. The layer-2 signal processing includes at least one of (i) data compression/de-compression, (ii) data encryption, (iii) addition/removal of a layer-2 header, (iv) data segmentation/concatenation, and (v) composition/decomposition of a transfer format by data multiplexing/de-multiplexing. In the case of E-UTRA, as a specific example, the layer-2 signal processing includes processing of Radio Link Control (RLC) and Media Access Control (MAC). The physical layer signal processing includes channel coding/decoding, modulation/demodulation, spreading/de-spreading, resource mapping, and generation of OFDM symbol data (baseband OFDM signal) by Inverse Fast Fourier Transform (IFFT).

The RE plays a role in performing analog radio frequency (RF) signal processing, and provides an air interface to a mobile station. The analog radio frequency (RF) signal processing includes D/A conversion, A/D conversion, frequency up-conversion, frequency down-conversion, and amplification. The RE is also referred to as a remote radio head (RRH).

For example, in the case of a radio access network of a universal mobile telecommunications system (UMTS), the REC provides a connection to a radio network controller (RNC) using an Iub interface for sending and receiving user data (user plane data) and control data (control plane data). On the other hand, the RE provides a mobile station with an air interface called a Uu interface.

In the case of Evolved Universal Terrestrial Radio Access (E-UTRA), the REC provides a connection to an evolved packet core (EPC) using an S1 interface for sending and receiving user data and control data. On the other hand, the RE provides a mobile station with an air interface called an LTE-Uu interface.

As described above, the separated structure of the radio base station disclosed in Patent Literature 1 and Non-Patent Literature 1 is characterized in that a part that performs analog RF signal processing is separated as the RE. This separated structure makes it possible to flexibly and effectively deal with an increase and a change in the functions implemented in the radio base station. In addition, this separated structure makes it possible to easily deal with independent advancement of an analog RF technique and a digital baseband technique by separating the two techniques.

CITATION LIST

Patent Literature

Patent literature 1: International Patent Publication No. WO 2004/095861

Non-Patent Literature

Non-Patent literature 1: Common Public Radio Interface (CPRI) Specification V4.2 (2010-09-29), [online], September, 2010, Ericsson AB, Huawei Technologies Co. Ltd., NEC Corporation, Alcatel Lucent and Nokia Siemens Networks GmbH & Co. KG, [retrieved on Oct., 20, 2011], Internet <URL:http://www.cpri.info/spec.html>

SUMMARY OF INVENTION

Technical Problem

It is predicted that as the traffic (user data) to be processed by the radio base station increases, the traffic between the REC and the RE also increases. It is also predicted that the increase in the traffic to be processed by the radio base station causes an increase in the processing load of the REC. To deal with these problems, the present inventors have studied a modification so as to perform dynamic scheduling at the RE, instead of at the REC. The dynamic scheduling dynamically allocates radio resources to mobile stations or user data. The radio resources are distinguished by time, frequency, or spreading code, or a combination thereof. When the dynamic scheduling is performed in a distributed manner between the REs, a reduction in the processing load of the REC can be expected. Further, a function for buffering the downlink user data is also allocated to the RE, there is no need to transfer user data from the REC to the RE for downlink re-transmission, so that a reduction in the traffic between the REC and the RE can also be expected.

However, the modification so as to perform the dynamic scheduling at the RE instead of the REC causes another problem. Specifically, when the dynamic scheduling is performed at the RE, it is difficult to perform a cooperative control among a plurality of REs. A specific example of the cooperative control among the plurality of REs is cooperative transmission and reception (e.g., Inter-Cell Interference Coordination (ICIC), Coordinated multipoint transmission/reception (CoMP)) between one mobile station and a plurality of cells (or sectors) of the plurality of REs. The CoMP is to be adopted as an LTE-Advanced technique that is being standardized by the 3rd Generation Partnership Project (3GPP). The CoMP is intended to, for example, increase the communication speed of mobile stations located at a cell edge, and improve the cell throughput. In the CoMP, cells or sectors cooperate with each other to transmit and receive signals to and from one mobile station. This leads to an improvement of the Signal to Noise Ratio (SNR) and suppression of the inter-cell interference. To carry out the CoMP, it is desirable to perform a radio resource control for a plurality of cells (or sectors) in a centralized manner. The centralized radio resource control can be achieved relatively easily by performing the dynamic scheduling for the plurality of REs at one REC in a centralized manner.

As described above, for example, the need for reducing the processing load of the REC and the need for achieving the cooperative control among the plurality of REs are conflicting needs in terms of the allocation of the dynamic scheduling function. In other words, when the dynamic scheduling is performed at the REC or at the RE in a fixed manner, one of the above-mentioned needs can be met, but it is difficult to meet the other need. Additionally, other needs, such as the need for reducing a line capacity between the REC and the RE and the need for suppressing power consumption in the REC, conflict with the need to achieve the cooperative control. Accordingly, it is desirable to appropriately select one of the REC and the RE to perform at least a part of the dynamic scheduling, depending on the need to be preferentially met.

The present invention has been made based on the above-mentioned study by the present inventors. Therefore, it is an object of the present invention to provide a radio station having a separated structure and a method of processing user data capable of selecting which one of the REC and the RE is used to perform at least a part of dynamic scheduling of radio resources.

Solution to Problem

A first aspect of the present invention includes a radio station that is used in a radio communication network and is capable of transmitting and receiving user data including downlink user data and uplink user data to and from a plurality of mobile stations via an air interface. The radio station includes a first part and at least one second part that can be arranged so as to be physically separated from the first part and is connected to the first part via a transmission line so as to be able to communicate with the first part.

The first part includes a first scheduling unit capable of performing dynamic scheduling to allocate a plurality of radio resources to the plurality of mobile stations or the user data. The second part includes an analog signal processing unit and a second scheduling unit. The analog signal processing unit performs analog signal processing including at least one of frequency conversion and power amplification to provide an air interface to a first mobile station connected to the second part among the plurality of mobile stations. The second scheduling unit is configured to be capable of performing, instead of the first scheduling unit, at least a part of dynamic scheduling for the first mobile station.

A second aspect of the present invention includes a method of processing user data performed by a radio base station. The radio station is used in a radio communication network, and is configured to transmit and receive user data including downlink user data and uplink user data to and from a plurality of mobile stations via an air interface. The radio station includes a first part and at least one second part that can be arranged so as to be physically separated from the first part and is connected to the first part via a transmission line so as to be able to communicate with the first part.

The first part includes a first scheduling unit capable of performing dynamic scheduling to allocate a plurality of radio resources to the plurality of mobile stations or the user data. The second part includes a second scheduling unit capable of performing, instead of the first scheduling unit, at least a part of dynamic scheduling for a first mobile station connected to the second part.

The processing method according to the second aspect includes alternatively using one of the first and second scheduling units to perform the at least a part of the dynamic scheduling for the first mobile station.

Advantageous Effects of Invention

According to the above-mentioned aspects of the present invention, it is possible to provide a radio station having a separated structure and a method of processing user data capable of selecting which one of the REC and the RE is used to perform dynamic scheduling of radio resources.

DESCRIPTION OF EMBODIMENTS

Figure 1:
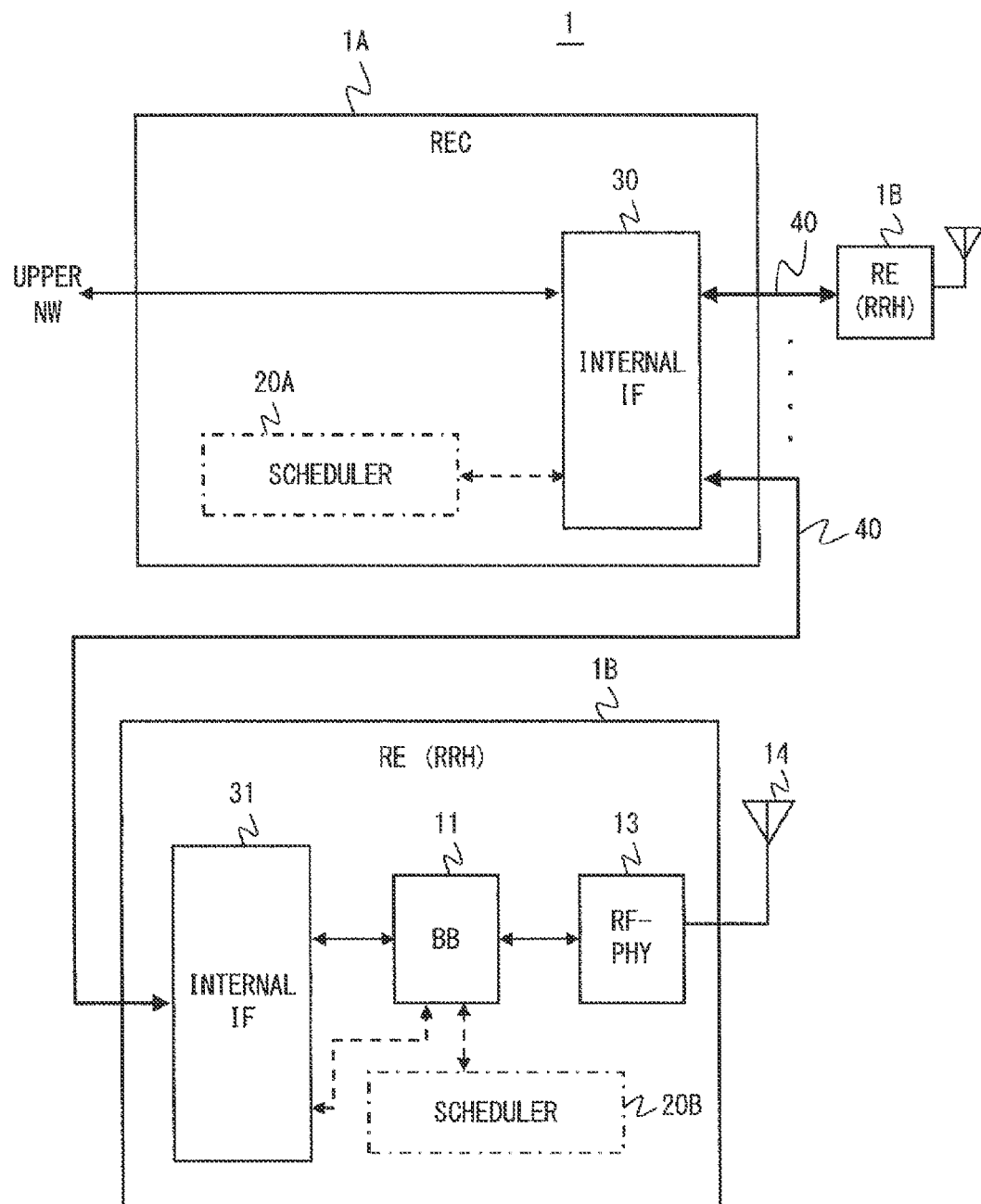
FIG. 1 is a block diagram showing a configuration example of a radio base station according to a first embodiment of the invention.

Specific embodiments of the present invention will be described in detail below with reference to the drawings. The same or corresponding components are denoted by the same reference numerals throughout the drawings, and a repeated description thereof is omitted as needed to clarify the explanation. However, such a specific radio communication system is described not to limit the scope of the present invention, but to facilitate understanding of the present invention. In other words, those skilled in the art can apply the principle and idea grasped from the embodiments described in detail below to various radio communication systems.

First Embodiment

FIG. 1 is a block diagram showing a configuration of a radio base station 1 according to this embodiment. The radio base station 1 is used in a radio communication network and is capable of transmitting and receiving user data including downlink user data and uplink user data to and from a plurality of mobile stations via an air interface. The radio base station 1 includes a first part, i.e., a radio equipment controller (REC) 1A, and at least one second part, i.e., a radio equipment (RE) 1B. The RE 1B can be arranged so as to be physically separated from the REC 1A via a transmission line 40, and is connected to the REC 1A via the transmission line 40 so as to be able to communicate with the REC 1A. The transmission line 40 may be an electrical transmission line or an optical transmission line. Alternatively, the transmission line 40 may be a point-to-point type radio transmission line (e.g., a microwave radio transmission line). The transmission line 40 may include a plurality of physical transmission lines for bidirectional transmission. As shown in FIG. 1, a plurality of REs 1B may be connected to the REC 1A.

Internal interfaces 30 and 31, which are arranged in the REC 1A and the RE 1B, respectively, have layer-2 and layer-1 functions for bidirectional communication via the transmission line 40. Each of the internal interfaces 30 and 31 may be an electrical interface, an optical interface, or a radio interface. For example, an existing transceiver, such as 1000BASE-CX, 1000BASE-SX, 1000BASE-LX, 10 GBASE-LX4, or a fibre channel, may be used as the internal interfaces 30 and 31.

The REC 1A includes a scheduler 20A. The scheduler 20A is configured to be capable of performing dynamic scheduling for the downlink and uplink for a plurality of mobile stations that connect the air interface to the plurality of REs 1B connected to the REC 1A. In other words, the scheduler 20A dynamically allocates a plurality of downlink and uplink radio resources to a plurality of mobile stations or user data. The radio resources are distinguished by time, frequency, or spreading code, or a combination thereof. For example, in the case of E-UTRA, dynamic scheduling is performed assuming that each radio resource is a resource block and two resource blocks within one sub-frame (1 msec) are defined as a minimum unit. One resource block includes 12 subcarriers in a frequency domain, and includes seven OFDM symbols in a time domain.

The dynamic scheduling for the downlink is achieved by selecting data to be allocated to each radio resource from a buffer (not shown), by using a scheduling technique such as Proportional Fairness (PF), max-C/I (carrier/interference), or round robin. The buffer temporarily stores the downlink user data which has arrived from an upper network. The buffer may store encrypted bearer data (e.g., SI bearer data) transferred between the upper network and the base station 1. Alternatively, the buffer may store data (e.g., PDCP Protocol Data Units (PDUs), RLC PDUs) obtained by performing the layer-2 processing, such as data compression (e.g., IP header compression) and segmentation/concatenation, on the downlink user data. The buffer is prepared, for example, for each mobile station, for each bearer, for each QoS class, or for each mobile station and each QoS class. The unit in which the buffer is prepared is determined as appropriate depending on the layout of the buffer, requirements for scheduling (e.g., the presence or absence of a QoS class, the necessity to secure a transmission rate), or the like.

The dynamic scheduling for the uplink is performed based on, for example, the reception of a resource allocation request from a mobile station, or a monitoring result of a data buffer arranged in the mobile station. The dynamic scheduling for the uplink is achieved by determining mobile stations to be allocated to radio resources, by using a scheduling technique such as PF, max-C/I, or round robin.

Further, in the case of E-UTRA, as a specific example, the dynamic scheduling performed by the scheduler 20A includes selection of a payload in a radio link control (RLC) sublayer, control of re-transmission in a MAC sublayer, and designation of a coding rate, a modulation scheme and a radio resource in a physical layer. Control information relating to the dynamic scheduling are sent to a BB unit 11 by signaling as indicated by dashed lines in FIG. 1.

Next, the RE 1B will be described. The RE 1B shown in FIG. 1 includes the BB unit 11, an RF-PHY unit 13, and a scheduler 20B. Among these units, the BB unit 11 or a part of digital baseband signal processing performed by the BB unit 11 may be arranged in the REC 1A.

The BB unit 11 performs digital baseband signal processing. In other words, the BB unit 11 performs digital baseband signal processing for transmitting the downlink user data to the air interface and for restoring the uplink user data from the signal received from the air interface. The digital baseband signal processing performed by the BB unit 11 includes, for example, layer-2 signal processing and layer-1 (physical layer) signal processing. In this case, the layer-2 signal processing includes at least one of (i) data compression/de-compression, (ii) data encryption, (iii) addition/removal of a layer-2 header, (iv) data segmentation/concatenation, and (v) composition/decomposition of a transfer format by data multiplexing/de-multiplexing. The physical layer signal processing includes channel coding/decoding and modulation/demodulation.

In the case of E-UTRA, as a specific example, the layer-2 signal processing includes processing of the RLC sublayer and the MAC sublayer. The RLC sublayer utilizes a bearer termination unit 10 as an upper protocol layer. The MAC sublayer utilizes the RLC sublayer as an upper protocol layer, and utilizes the baseband signal processing on the physical layer (BB-PHY) as a lower protocol layer. The E-UTRA further includes a PDCP sublayer as an upper sublayer of the RLC sublayer. However, processing (e.g., IP header compression, encryption) in the PDCP sublayer is not essential and may be omitted.

In the case of E-UTRA, the PDCP sublayer plays a role in performing processing for reducing the data amount to be transmitted in a manner suitable for the transmission and reception via the air interface. Specifically, the PDCP sublayer performs IP header compression for the downlink user data, and IP header de-compression for the uplink user data. The PDCP sublayer also performs encryption of the user data, and duplication and transfer of the user data so as to reduce a delay in handover.

The RLC sublayer of the E-UTRA performs segmentation and concatenation and re-transmission control for radio bearer data (PDCP Protocol Data Units (PDUs)) supplied from the PDCP sublayer. The RLC sublayer provides, to the PDCP sublayer, a data transfer service using a radio bearer. The RLC sublayer is connected to the MAC sublayer through a logical channel (RLC PDUs).

The MAC sublayer of the E-UTRA performs multiplexing of the logical channels (RLC PDUs), and hybrid-ARQ re-transmission. The MAC sublayer generates a transport channel by multiplexing the logical channels (RLC PDUs). The transmission format (data block size) of the transport channel depends on an instantaneous data rate. The MAC sublayer is connected to the physical layer through the transport channel (MAC PDUs).

In the case of E-UTRA, the physical layer signal processing includes not only channel coding/decoding and modulation/demodulation, but also resource mapping and generation of OFDM symbol data (baseband OFDM signal) by Inverse Fast Fourier Transform (IFFT).

The RF-PHY unit 13 is connected to an antenna 14, and performs analog RF signal processing on the physical layer to provide an air interface to each mobile station connected to the RE 1B. The analog RF signal processing performed by the RF-PHY unit 13 includes at least one of D/A conversion, A/D conversion, frequency up-conversion, frequency down-conversion, and amplification. The RF-PHY unit 13 is coupled to the BB unit 11 described above. Specifically, the RF-PHY unit 13 receives modulation symbol data (or OFDM symbol data) from the BB unit 11, generates a downlink RF signal, and transmits the downlink RF signal via the antenna 14. The RF-PHY unit 13 receives an uplink RF signal from the antenna 14, generates a baseband reception signal stream, and supplies the baseband reception signal stream to the BB unit 11

The scheduler 20B is configured to be capable of performing, instead of the scheduler 20A, dynamic scheduling for mobile stations connected to the RE 1B. In other words, the scheduler 20B can perform, alternatively with the scheduler 20A, dynamic scheduling for mobile stations connected to the RE 1B. Specifically, the scheduler 20B can perform dynamic scheduling for mobile stations connected to the RE 1B in the same manner as the scheduler 20A.

The radio base station 1 alternatively uses one of the schedulers 20A and 20B to perform dynamic scheduling for mobile stations connected to the RE 1B. The selection of one of the schedulers 20A and 20B to be used may be collectively performed for all user data pertaining to all mobile stations connected to the radio base station 1. Alternatively, the selection may be individually performed for each mobile station, for each user data, or for each bearer (e.g., an S1 bearer) encrypted between the upper network and the radio base station 1. When a plurality of REs 1B are connected to the base station 1, the selection of one of the schedulers 20A and 20B to be used may be individually performed for each RE 1B.

The selection of one of the schedulers 20A and 20B to be used may be performed through manual setting of the radio base station 1 by an operator. Alternatively, the selection may be autonomously performed by a controller (not shown), which is arranged in the REC 1A or the RE 11B, by determining the establishment of a selection condition. In one more alternative, the selection may be performed based on an instruction from an external device, such as a resource control apparatus or an OAM (Operation Administration and Maintenance) system, which are arranged outside of the radio base station 1.

Next, conditions for selecting one of the schedulers 20A and 20B will be described. The selection of one of the schedulers 20A and 20B to be used can be performed based on various selection conditions. A selection condition to be used may be determined as appropriate depending on the needs to be preferentially met, such as the achievement of the cooperative control among the plurality of REs, the reduction in the processing load of the REC, or the reduction in the traffic between the REC and the RE. Specific examples of selection conditions for the schedulers 20A and 20B are given below.

Specific Example 1

The selection of one of the schedulers 20A and 20B to be used is performed based on the amount of traffic to be processed by the entire radio base station 1, the REC 1A, or the RE 1B. For example, when the amount of traffic to be processed by the RE 1B exceeds a predetermined level, the scheduler 20A of the REC 1A may be selected. By preferentially using the scheduler 20A of the REC 1A, the cooperative transmission and reception (e.g., CoMP) between one mobile station and a plurality of cells (or sectors) of a plurality of REs 1B can be performed relatively easily, and the cell throughput can be increased. On the other hand, when the amount of traffic to be processed by the RE 1B is less than the predetermined level, the scheduler 20B of the RE 1B may be selected. As a result, the amount of traffic between the REC and the RE can be reduced. A reduction in power consumption of the REC 1A can also be expected.

Specific Example 2

The selection of one of the schedulers 20A and 20B to be used is performed based on the necessity to perform a cooperative control among a plurality of REs 1B connected to the REC 1A. For example, when it is necessary to preferentially perform the cooperative control among the plurality of REs 1B, the scheduler 20A of the REC 1A may be selected. This makes it possible to relatively easily perform the cooperative transmission and reception (e.g., CoMP). On the other hand, when there is no need to perform the cooperative control among the plurality of REs 1B, or when a higher priority is placed on another condition (e.g., a reduction in power consumption of the REC 1A, or a reduction in traffic between the REC and the RE), the scheduler 20B of the RE 1B may be selected. This makes it possible to meet another need, such as a reduction in power consumption of the REC 1A, when there is no need for the cooperative transmission and reception.

Specific Example 3

The selection of one of the schedulers 20A and 20B to be used is performed based on a status of occurrence of re-transmission in the air interface. For example, when the number of occurrences or an occurrence rate of automatic repeat request (ARQ) re-transmission (H-ARQ re-transmission in E-UTRA) for each mobile station connected to the RE 1B, or for each REC 1B, exceeds a predetermined level, the scheduler 20B of the RE 1B may be selected. This eliminates the need to transfer the user data for re-transmission from the REC 1A to the RE 1B, resulting in a reduction in the amount of traffic between the REC and the RE.

Specific Example 4

The selection of one of the schedulers 20A and 20B to be used is performed based on the power consumption of the entire radio base station 1, the REC 1A, or the RE 1B. For example, when the power consumption of the REC 1A exceeds a predetermined level, the scheduler 20B of the RE 1B may be selected. This leads to a reduction in power consumption of the REC 1A. Further, for example, when the power consumption of the RE 1B exceeds the predetermined level, the scheduler 20A of the REC 1A may be selected. This leads to a reduction in power consumption of the RE 1B.

Specific Example 5

The selection of one of the schedulers 20A and 20B to be used is performed based on the load status of the REC 1A or the RE 1B. For example, when the load of the REC 1A exceeds a predetermined level, the scheduler 20B of the RE 1B may be selected. This makes it possible to achieve a distribution of the load between the REC 1A and the RE 1B and suppress an increase in the load of the REC 1A. Further, for example, when the load of the RE 1B exceeds the predetermined level, the scheduler 20A of the REC 1A may be selected. This makes it possible to suppress an increase in the load of the RE 1B. More specifically, a resource use rate of each RE 1B (each cell) is measured periodically, and when the resource use rate exceeds the predetermined level, the scheduler 20A of the REC 1A may be selected. Alternatively, in the case of setting a new bearer, the resource use rate of the RE 1B may be determined, and when the resource use rate exceeds the predetermined level, the scheduler 20A of the REC 1A may be selected.

Specific Example 6

The selection of one of the schedulers 20A and 20B to be used is performed based on the processing capacity of the REC 1A or the RE 1B. For example, when the processing capacity of the RE 1B is less than a predetermined level, the scheduler 20A of the REC 1A may be selected. This selection condition is effective when the processing capacity of the scheduler 20B is smaller than that of the scheduler 20A. Since the amount of traffic to be processed by the RE 1B varies depending on the installation location of the RE 1B, the processing capacity required for the RE 1B also varies. Accordingly, when the RE 1B is arranged at a high traffic point and the processing capacity of the scheduler 20B is not sufficient, the scheduler 20A of the REC 1A may be selected.

Specific Example 7

The selection of one of the schedulers 20A and 20B to be used is performed based on a power supply status with respect to the REC 1A. For example, when a charging status of a battery which supplies power to the REC 1A, i.e., a charge amount or a charged percentage, exceeds a predetermined level, the scheduler 20A of the REC 1A may be selected. On the other hand, when the charging status of the battery which supplies power to the REC 1A is less than the predetermined level, the scheduler 20B of the RE 1B may be selected.

Specific Example 8

The selection of one of the schedulers 20A and 20B to be used is performed based on a power supply status with respect to the RE 1B. For example, when the RE 1B can be supplied with power from a power generating device capable of self-generation, such as photovoltaic power generation or wind power generation, the scheduler 20B of the RE 1B may be selected.

Specific Example 9

The selection of one of the schedulers 20A and 20B to be used is performed based on a security level or a QoS class of user data. Specifically, the scheduler 20B of the RE 1B may be selected for bearers requiring a high security level and for bearers to which a high QoS class is set, and the scheduler 20A of the REC 1A may be selected for the other bearers. In this case, it is preferable that a termination point of a bearer (e.g., an S1 bearer) encrypted between the upper network and the radio base station 1 selectable between the REC 1A and the RE 1B.

The specific examples 1 to 9 of the selection conditions described above are illustrated by way of example only, and other selection conditions may also be used, as a matter of course. Further, the specific examples 1 to 9 of the selection conditions described above and other optional selection conditions can be combined as appropriate and used.

The scheduler 20B may be configured to be capable of performing, instead of the scheduler 20A, only a part of the dynamic scheduling for mobile stations connected to the RE 1B, instead of performing the whole dynamic scheduling. For example, the scheduler 20A may determine a range of radio resources that can be allocated to mobile stations connected to the RE 1B. In this case, the scheduler 20B may dynamically allocate the resources to the mobile stations from the range of radio resources determined by the scheduler 20A. Alternatively, for example, the scheduler 20A may perform dynamic scheduling except for H-ARQ re-transmission, and the scheduler 20B may perform scheduling for H-ARQ re-transmission. Furthermore, the scheduler 20B may calculate a parameter used for dynamic scheduling based on the radio communication quality of the air interface, and may send the parameter to the scheduler 20A. In this case, the scheduler 20A may perform dynamic scheduling by using the parameter calculated by the scheduler 20B.

As described above, the radio base station 1 according to this embodiment includes the schedulers 20A and 20B, and is configured to select one of the schedulers 20A and 20B to be used to perform at least a part of the dynamic scheduling for each mobile station connected to the RE 1B. Accordingly, the radio base station 1 can select which one of the REC 1A and the RE 1B is used to perform at least a part of the dynamic scheduling of radio resources, depending on the need to be preferentially met among a plurality of needs, such as the need for reducing the processing load of the REC 1A, and the need for achieving a cooperative control among a plurality of REs 1B.

As previously mentioned, the layout of the BB unit 11 in FIG. 1 is illustrated by way of example only. At least a part of the digital baseband signal processing (e.g., layer-2 signal processing, PDCP sublayer processing) performed by the BB unit 11 may be allocated to the REC 1A. Although not shown in FIG. 1, the layout of a function for terminating a bearer established with the upper network can be modified in various manners. Further, the layout of the buffer referred to by the scheduler 20 for dynamic scheduling of the downlink can also be modified in various manners. In other words, the bearer termination function and the buffer can be appropriately distributed between the REC 1A and the RE 1B. Various additional effects can be obtained by adjusting the layout of these functional units. Various aspects of the layout of these functional units will be described in the following second to eighth embodiments.

Second Embodiment

Figure 2:
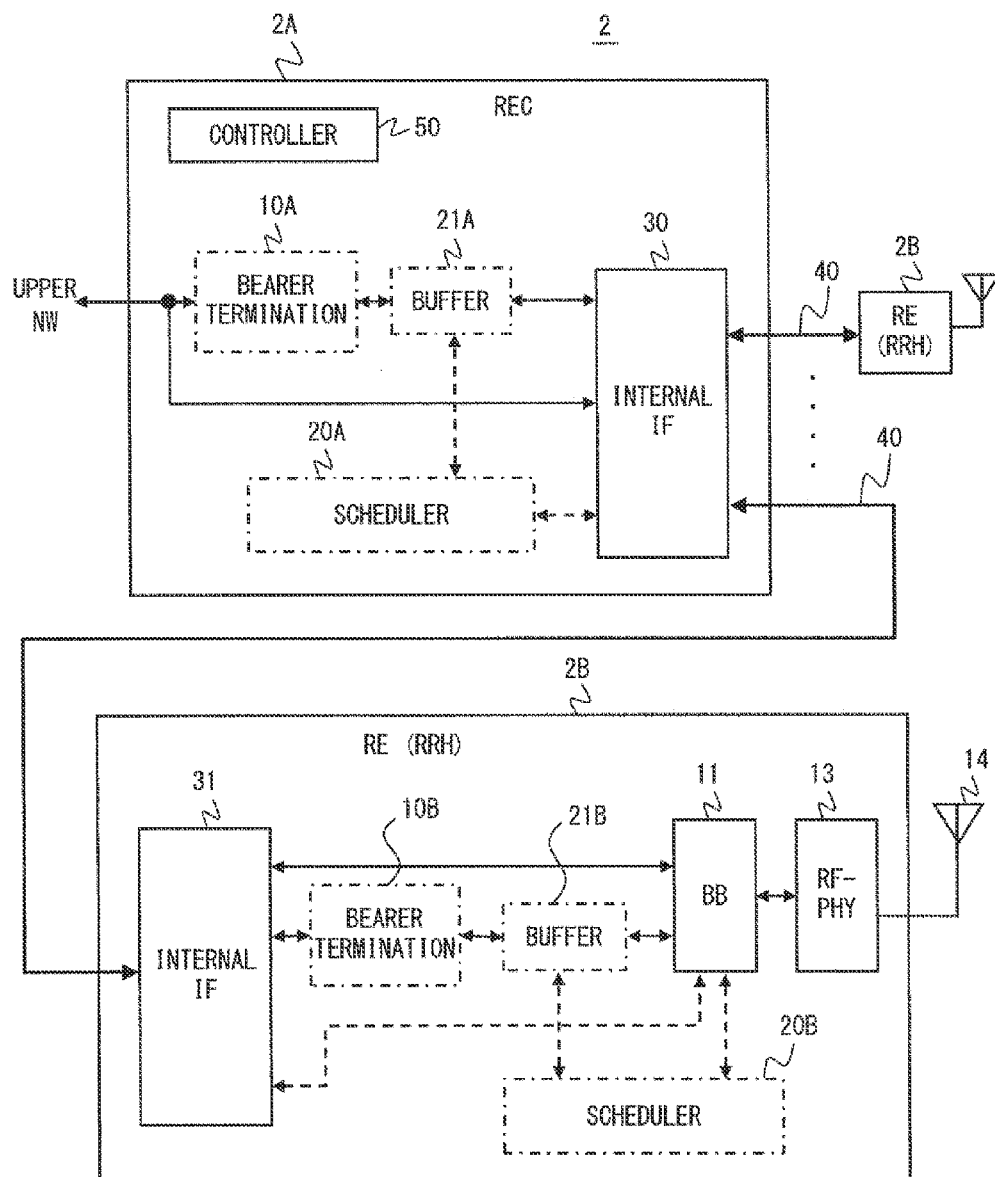
FIG. 2 is a block diagram showing a configuration example of a radio base station according to a second embodiment of the invention.

FIG. 2 is a block diagram showing a configuration example of a radio base station 2 according to this embodiment. The radio base station 2 includes a first part, i.e., a radio equipment controller (REC) 2A, and at least one second part, i.e., a radio equipment (RE) 2B. The REC 2A includes a bearer termination unit 10A and a buffer 21A. The RE 2B includes a bearer termination unit 10B and a buffer 21B. The radio base station 2 switches, between the REC and the RE, a termination point of a bearer between the upper network and the radio base station in accordance with a selection of one of the schedulers 20A and 20B.

The bearer termination units 10A and 10B can terminate a bearer established between the upper network (e.g., RNC of UMTS, EPC of E-UTRA) and the base station 2 so as to transfer user data. In general, a bearer (e.g., an S1 bearer of E-UTRA) for transferring user data is encrypted with a tunneling protocol (e.g., IPsec). A bearer is established for each data flow (e.g., a Packet Data Network (PDN) connection of E-UTRA) between each mobile station and an external network. Accordingly, the bearer termination units 10A and 10B can terminate a plurality of encrypted bearers between the upper network and the base station 2, receive the downlink user data pertaining to a plurality of mobile stations from the upper network, and send the uplink user data pertaining to the plurality of mobile stations to the upper network.

The buffers 21A and 21B can temporarily store the downlink user data which has arrived from the upper network. The buffer 21A is referred to by the scheduler 20A for the dynamic scheduling. The buffer 21B is referred to by the scheduler 20B for the dynamic scheduling.

The radio base station 2 selects one of the bearer termination units 10A and 10B and selects one of the buffers 21A and 21B, in accordance with the selection of one of the schedulers 20A and 20B. Specifically, the radio base station 2 selects the bearer termination unit 10A and the buffer 21A when the scheduler 20A of the REC 2A is used for dynamic scheduling for mobile stations connected to the RE 2B. On the other hand, the radio base station 2 selects the bearer termination unit 10B and the buffer 21B when the scheduler 20B of the RE 2B is used.

When the bearer is terminated in the RE 2B, the radio base station 2 transfers the encrypted bearer data (e.g., S1 bearer data) via the transmission line 40 from the REC 2A to the RE 2B. This allows the radio base station 2 to enhance security between the REC 2A and the RE 2B. As described above, the RE 2B is expected to be arranged at a remote location that is easily accessed by a third party. Transmission of the encrypted bearer data, instead of the user data, makes it possible to protect the user data against unauthorized access.

The selection between the bearer termination units 10A and 10B, that is, the selection of a bearer termination point, can be performed in accordance with, for example, "specific example 9" of the selection conditions described above. In this case, a termination point may be individually selected for each bearer. Specifically, bearers requiring a high security level and bearers to which a high QoS class is set may be terminated in the RE 2B. The other bearers may be terminated in the REC 2A. The selection between the bearer termination units 10A and 10B, as well as the selection between the schedulers 20A and 20B, may be performed based on at least one of the other specific examples 1 to 8.

Alternatively, for example, bearer termination points may be selected based on the security level of the transmission line 40 between the REC 2A and the RE 2B. Specifically, when the security level of the transmission line 40 is relatively high, the bearers may be terminated in the REC 2A, and when the security level of the transmission line 40 is relatively low, the bearers may be terminated in the RE 2B. The case where the security level of the transmission line 40 is relatively high is, for example, when the transmission line 40 is a dedicated line of a telecom carrier, or when the transmission line 40 is laid on the premises managed by the telecom carrier. The case where the security level of the transmission line 40 is relatively low is, for example, when the transmission line 40 is a general public line, or when the transmission line 40 is laid in a place that is not under full control.

Bearer termination points may be selected at the time of setting up the radio base station 2. Alternatively, bearer termination points may be selected according to switching of the transmission line 40, for example, switching between a main transmission line and a backup transmission line. Specifically, a controller 50 arranged in the radio base station 2 may switch termination points according to the respective security levels of the main transmission line and the backup transmission line when the main transmission line and the backup transmission line have different security levels. The switching of bearer termination points may be performed according to an instruction from an external device (e.g., a resource control device or an OAM system), instead of the controller 50.

On the other hand, the use of both the buffer 21A and the scheduler 20A, which are arranged in the REC 2A, facilitates the cooperative dynamic scheduling among the plurality of REs 2B. This is because the scheduler 20A can easily recognize the storage status of the buffer 21A and can easily transfer the downlink user data to RE 2Bs during the dynamic scheduling for the downlink. The use of the buffer 21A makes it possible to reduce the amount of control data to be transferred between the internal interfaces 30 and 31. The REC 2A (the internal interface 30) may selectively transmit data selected by the scheduler 20A from the downlink user data or from the data stream including the downlink user data stored in the buffer 21.

The radio base station 2 is configured to select one of the schedulers 20A and 20B to be used. Accordingly, the radio base station 2 can select which one of the REC 2A and the RE 2B is used to perform dynamic scheduling depending on the need to be preferentially met among the plurality of needs, as in the radio base station 1.

Further, in this embodiment, when the scheduler 20B is used, the bearer termination is also performed at the RE 2B. Accordingly, the use of the bearer termination unit 10B, the scheduler 20B, and the buffer 21B allows the radio base station 2 to enhance the security of the transmission line 40. On the other hand, when the need for a reduction in the amount of traffic between the REC and the RE, or the need for execution of the cooperative control among the plurality of REs 2B, should be met in priority to the need for the enhancement of the security of the transmission line 40, the radio base station 2 can meet this need by using the bearer termination unit 10A, the scheduler 20A, and the buffer 21A.

Figure 3A:
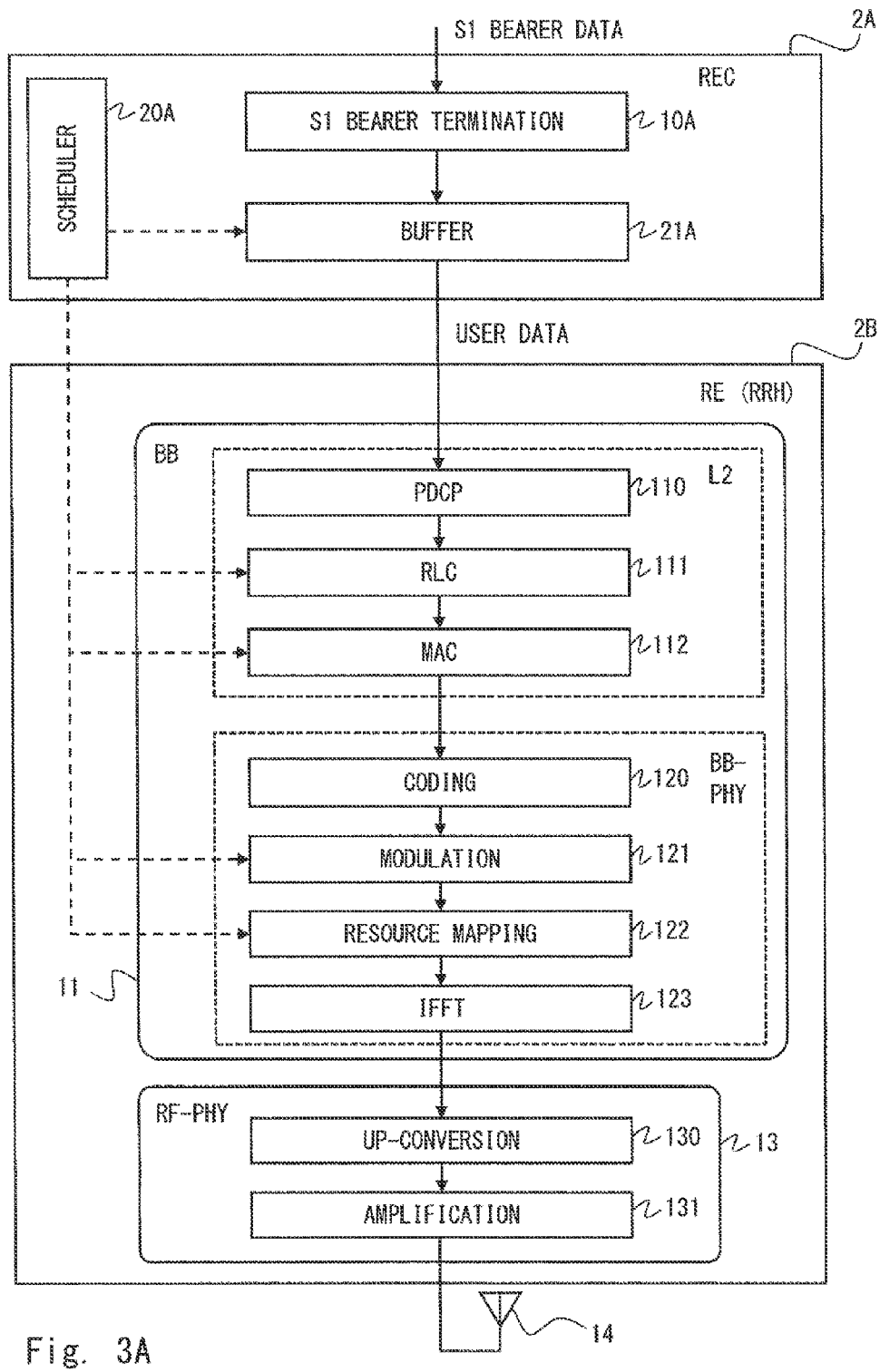
FIG. 3A is a diagram showing a protocol structure and a functional layout of the radio base station according to the second embodiment of the invention.
Figure 3B:
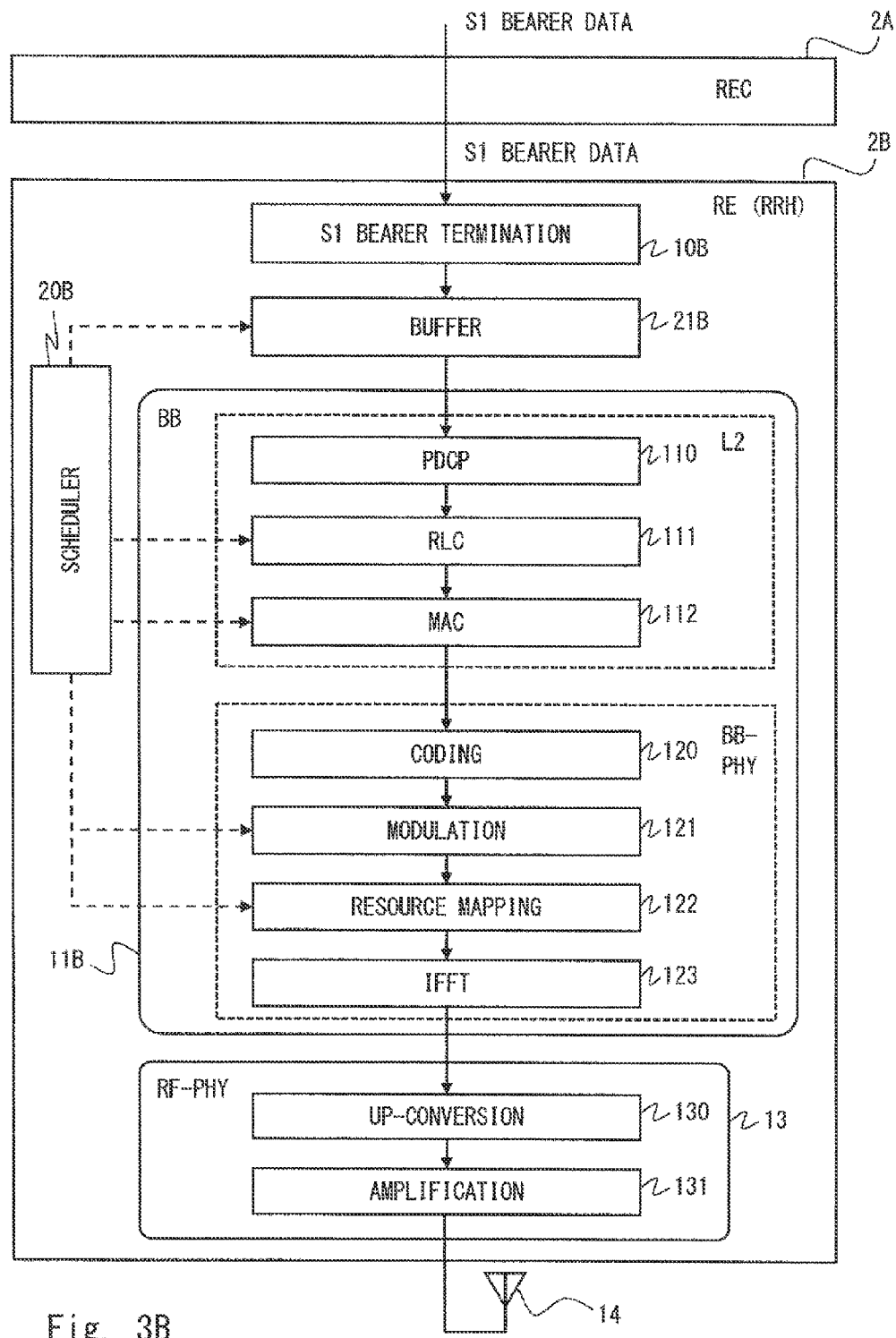
FIG. 3B is a diagram showing a protocol structure and a functional layout of the radio base station according to the second embodiment of the invention.

FIGS. 3A and 3B show the details of the functional layout in the radio base station 2 regarding the downlink transmission of user data in the E-UTRA. The functional layout shown in FIG. 3A corresponds to the case where the bearer termination unit 10A, the scheduler 20A, and the buffer 21A of the REC 2A are used in the configuration example of FIG. 2. On the other hand, the functional layout shown in FIG. 3B corresponds to the case where the bearer termination unit 10B, the scheduler 20B, and the buffer 21B of the RE 2B are used. In FIGS. 3A and 3B, the BB unit 11 includes three sub-units related to the layer-2 processing, i.e., a PDCP unit 110, an RLC unit 111, and a MAC unit 112. The PDCP unit 110 performs processing on the PDCP sublayer. The RLC unit 111 performs processing on the RLC sublayer. The MAC unit 112 performs processing on the MAC sublayer. The BB units 11 further includes four sub-units related to the baseband physical layer (BB-PHY) processing, i.e., a coding unit 120, a modulation unit 121, a resource mapping unit 122, and an IFFT unit 123. The RF-PHY unit 13 includes an up-converter 130 and an amplifier 131. In the example of FIG. 3A, the OFDM symbol data is transferred from the REC 2A to the RE 2B. In the example of FIG. 3B, the S1 bearer data is transferred from the REC 2A to the RE 2B.

Third Embodiment

Figure 4:
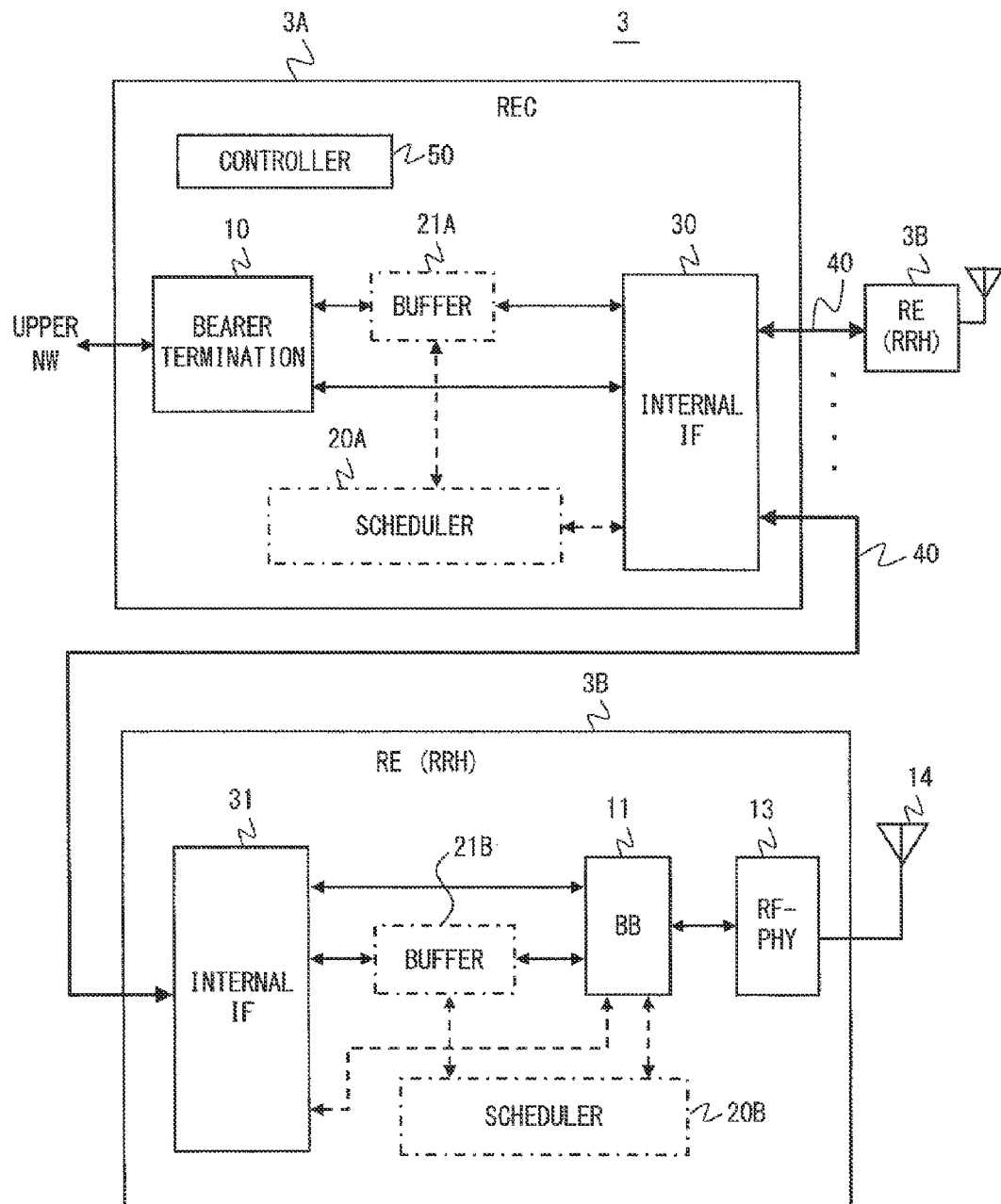
FIG. 4 is a block diagram showing a configuration example of a radio base station according to a third embodiment of the invention.

FIG. 4 is a block diagram showing a configuration example of a radio base station 3 according to this embodiment. The radio base station 3 includes a first part, i.e., a radio equipment controller (REC) 3A, and at least one second part, i.e., a radio equipment (RE) 3B. The radio base station 3 differs from the above-described radio base station 2 in that the bearer termination unit 10 is arranged only in the REC 3A. The bearer termination unit 10 terminates a bearer, which is established between the upper network (e.g., RNC of UMTS, EPC of E-UTRA) and the base station 3, so as to transfer user data. The layout of the buffers 21A and 21B is similar to that in the configuration example of the radio base station 2 shown in FIG. 2.

In FIG. 4, the REC 3A may be configured to perform processing (e.g., IP header compression, encryption) on the PDCP sublayer at the bearer termination unit 10. In this case, the BB unit 11 may perform other baseband signal processing (i.e., processing of RLC and MAC sublayers, and BB-PHY processing) except for the PDCP sublayer. In this case, the buffers 21A and 21B may store the PDCP PDUs for each mobile station, for each bearer, for each QoS class, or for each mobile station and each QoS class.

The radio base station 3 is configured to select one of the schedulers 20A and 20B to be used. Accordingly, the radio base station 3 can select which one of the REC 3A and the RE 3B is used to perform dynamic scheduling depending on the need to be preferentially met among the plurality of needs, as in the radio base station 1.

Furthermore, in contrast to the second embodiment described above, the REC 3A performs the bearer termination even when the scheduler 20B of the RE 3B is used in this embodiment. Accordingly, the header added to the encrypted bearer data (e.g., S1 bearer data) can be reduced. This leads to a reduction in the data amount to be transferred between the REC 3A and the RE 3B, as compared with the case of transmitting the bearer data to the RE 3B.

Figure 5A:
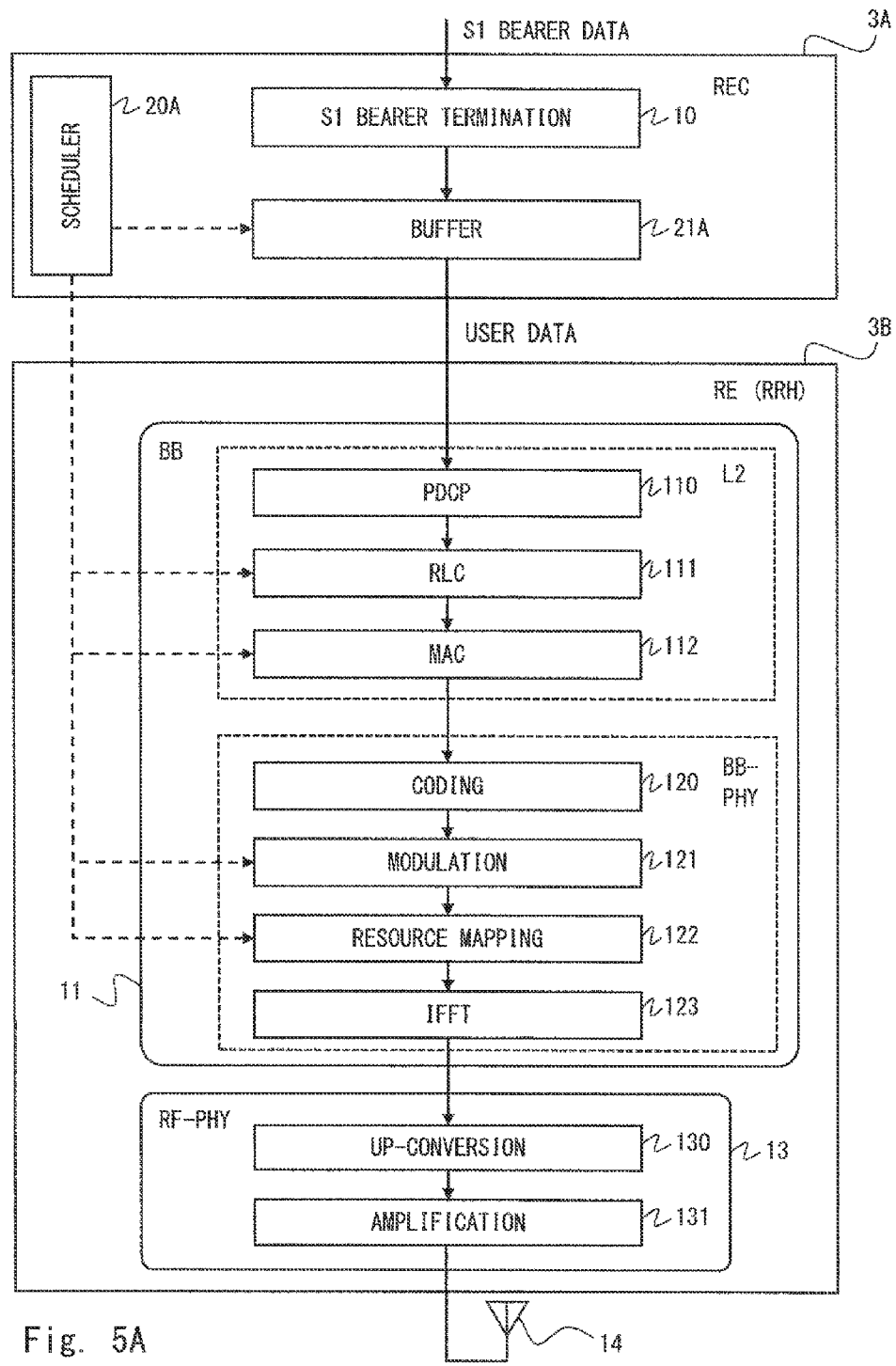
FIG. 5A is a diagram showing a protocol structure and a functional layout of the radio base station according to the third embodiment of the invention.
Figure 5B:
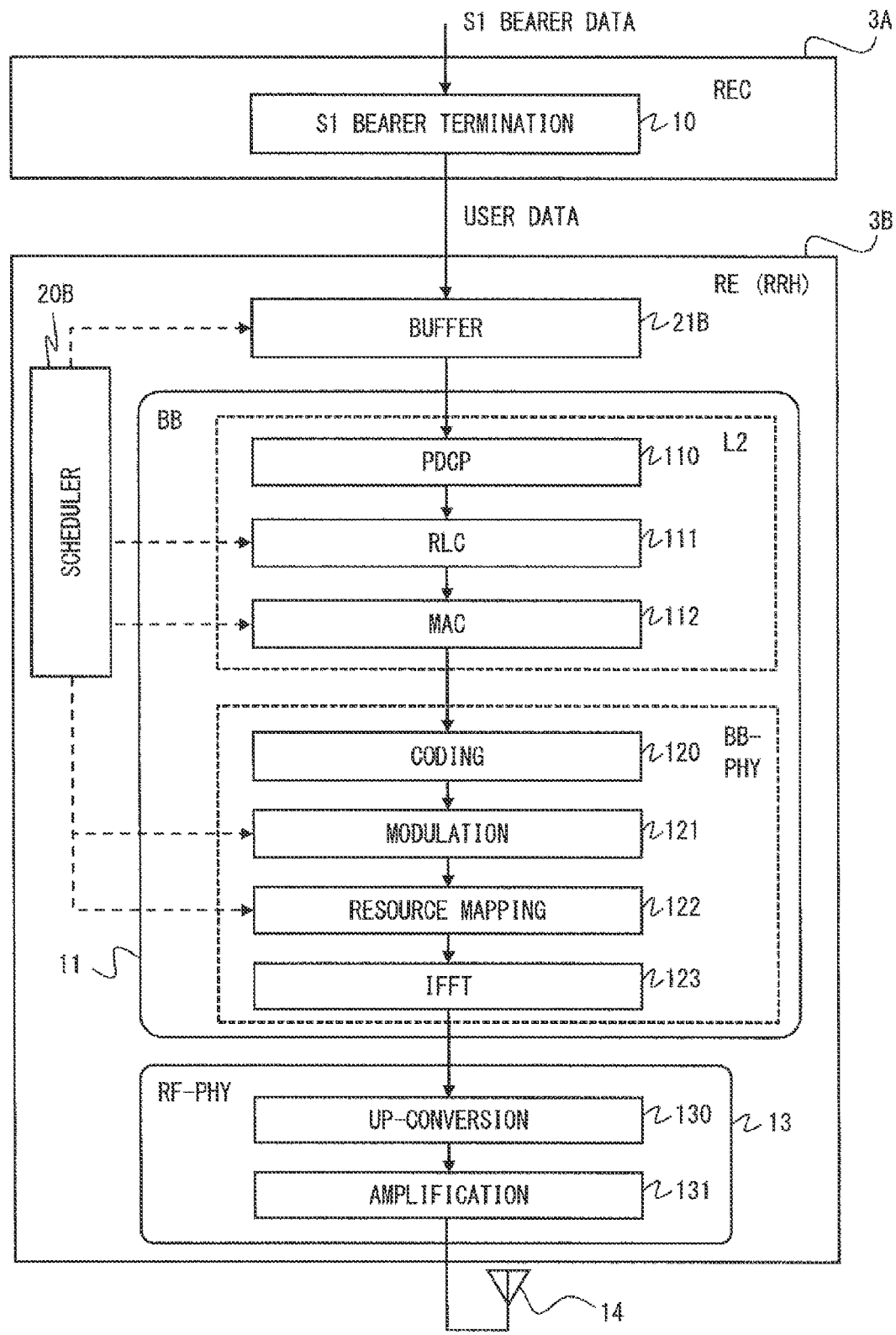
FIG. 5B is a diagram showing a protocol structure and a functional layout of the radio base station according to the third embodiment of the invention.

FIGS. 5A and 5B show the details of the functional layout in the radio base station 3 regarding the downlink transmission of user data in the E-UTRA. The functional layout shown in FIG. 5A corresponds to the case where the scheduler 20A of the REC 3A is used in the configuration example of FIG. 4. On the other hand, the functional layout shown in FIG. 5B corresponds to the case where the scheduler 20B of the RE 3B is used. In the examples shown in FIGS. 5A and 5B, the user data is transferred from the REC 3A to the RE 3B.

Fourth Embodiment

Figure 6:
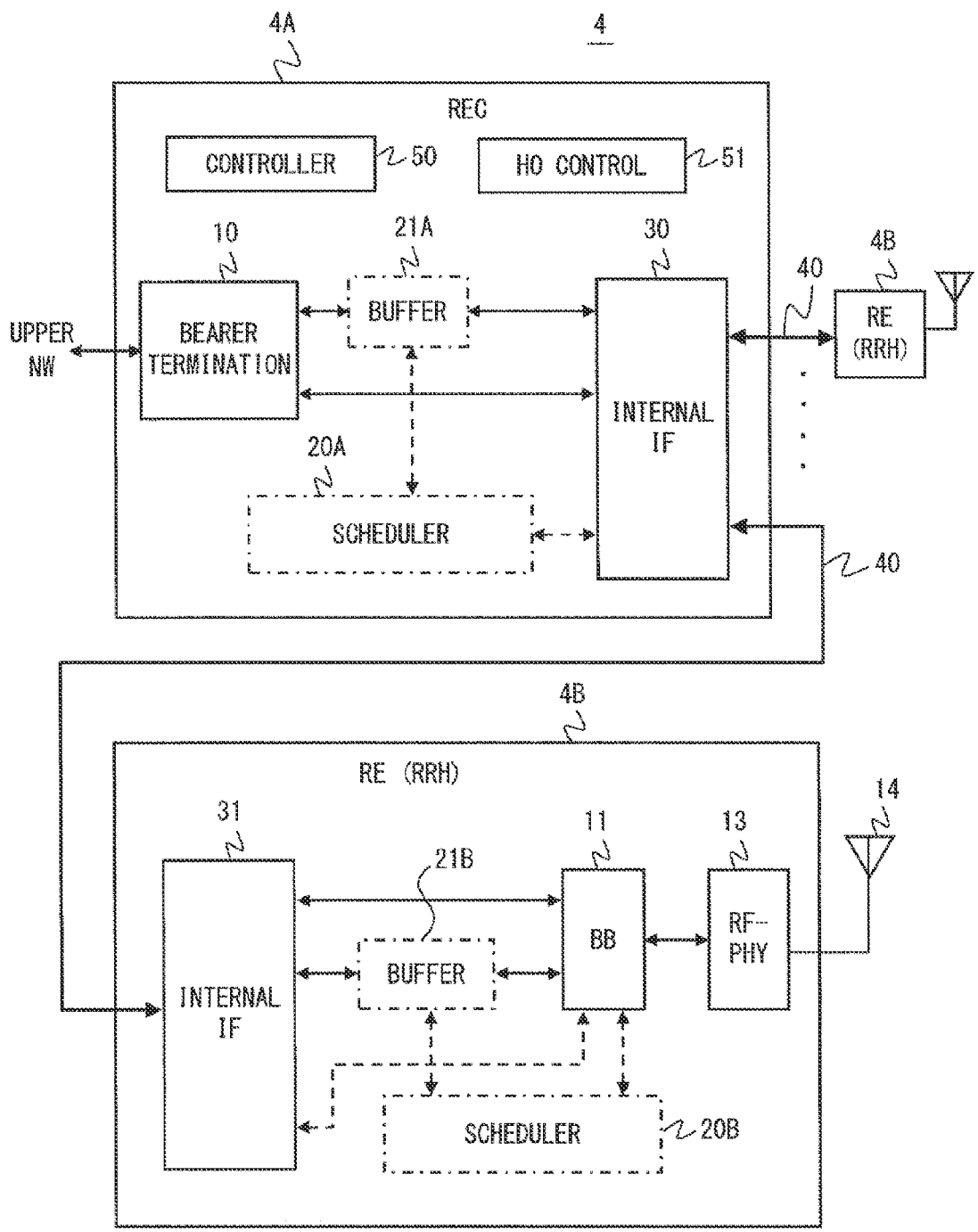
FIG. 6 is a block diagram showing a configuration example of a radio base station according to a fourth embodiment of the invention.

FIG. 6 is a block diagram showing a configuration example of a radio base station 4 according to this embodiment. The configuration example shown in FIG. 6 is a modification of the radio base station 3 shown in FIG. 4. The radio base station 4 includes a first part, i.e., a radio equipment controller (REC) 4A, and at least one second part, i.e., a radio equipment (RE) 4B. The radio base station 4 differs from the radio base station 3 shown in FIG. 4 in that the REC 5A includes a handover (HO) control unit 51. The configuration and functional layout of the RE 4B are the same as those of the RE 3B shown in FIGS. 4, 5A, and 5B.

When a mobile station communicating over an air interface performs handover to another base station (target base station), the HO control unit 51 transfers the downlink user data pertaining to the mobile station held in the buffer 21A or 21B, or the data stream including the downlink user data, to the target base station. The transfer of the user data to the target base station is performed in the same manner as in a typical handover procedure. Specifically, the user data may be transferred to the target base station by using an interface (e.g., an X2 interface) available between base stations, or may be transferred via an upper network.

In FIG. 6, the REC 4A may be configured to perform processing (e.g., IP header compression, encryption) on the PDCP sublayer at the bearer termination unit 10. In this case, the BB unit 11 may perform other baseband signal processing (i.e., processing of RLC and MAC sublayers, and BB-PHY processing) except for the PDCP sublayer. In this case, the buffers 21A and 21B may store the PDCP PDUs for each mobile station, for each bearer, for each QoS class, or for each mobile station and each QoS class.

In the configuration example shown in FIG. 6, when the scheduler 20A of the REC 4A is used, the REC 4A buffers the user data or the data stream (e.g., PDCP PDUs) containing the user data. This facilitates the data transfer to the target base station during the handover. In other words, there is no need to transfer the data from the RE 4B to the REC 4A during the handover. When a mobile station moves between REs 4B connected to the REC 4A, it is only necessary for the REC 4A to change the transmission destination of the buffered user data or the data stream (e.g., PDCP PDUs) containing the user data to the RE 4B as the handover target. This makes it possible to easily provide continuous services by following the movement of a mobile station.

Fifth Embodiment

As described above with reference to the first to fourth embodiments, at least a part of the digital baseband processing (e.g., layer-2 signal processing, PDCP sublayer processing) performed by the BB unit 11 may be allocated to the REC. In this embodiment, an example in which the REC performs a part of the layer-2 signal processing and the RE performs other processing will be described.

Figure 7:
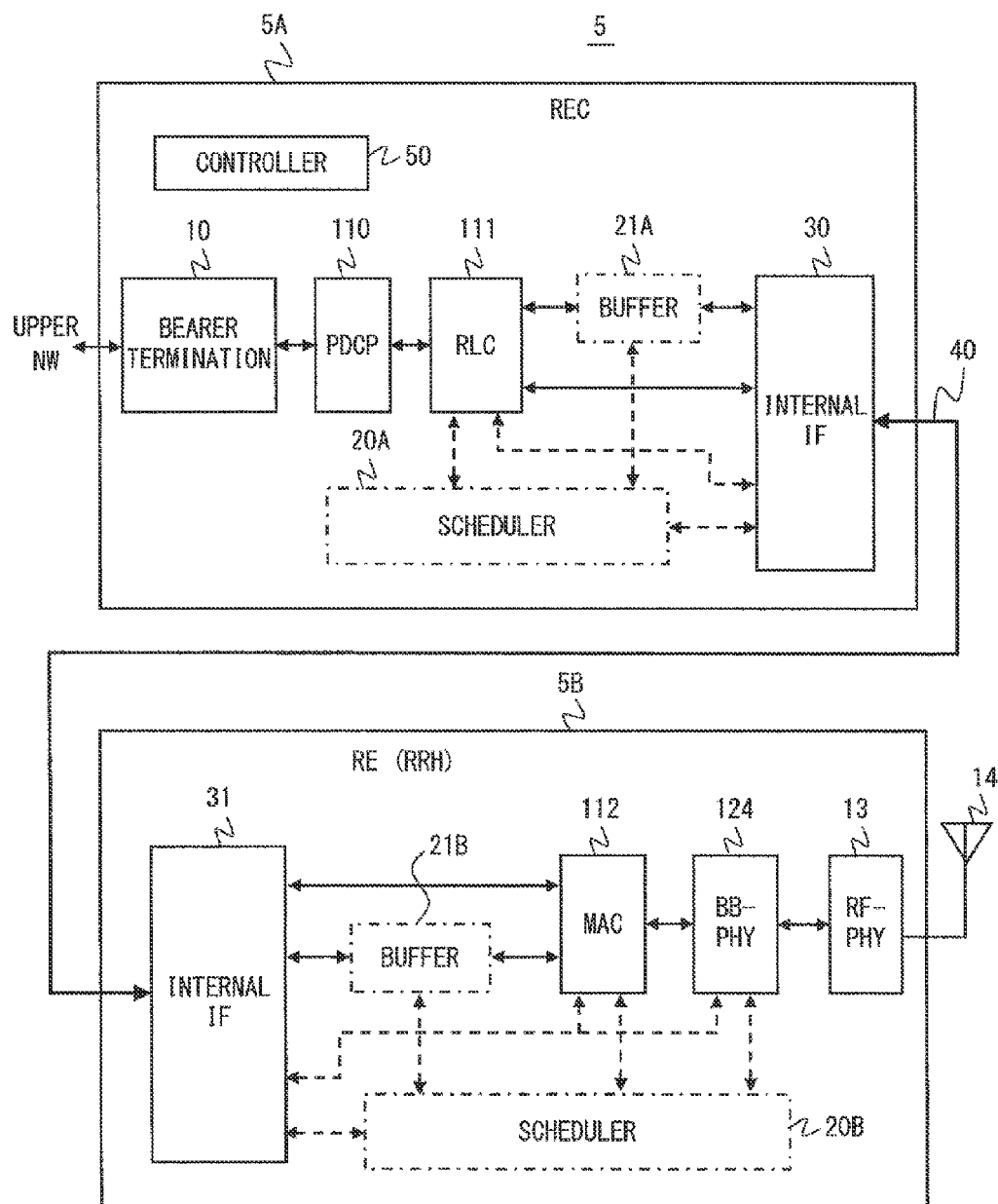
FIG. 7 is a block diagram showing a configuration example of a radio base station according to a fifth embodiment of the invention.

FIG. 7 is a block diagram showing a configuration example of a radio base station 5 according to this embodiment. The radio base station 5 includes a first part, i.e., a radio equipment controller (REC) 5A, and at least one second part, i.e., a radio equipment (RE) 5B. Though only one RE 5B is illustrated in FIG. 7, a plurality of REs 5B may be connected to the REC 5A as shown in FIG. 1. In the configuration example of FIG. 7, the REC 5A performs a part of the layer-2 signal processing, i.e., (i) data compression/de-compression, (ii) data encryption, (iii) addition/removal of a layer-2 header, and (iv) data segmentation/concatenation. On the other hand, the RE 5B performs other part of the layer-2 signal processing, i.e., (v) composition/decomposition of a transfer format by data multiplexing/demultiplexing. Further, the RE 5B performs the baseband signal processing on the physical layer, including channel coding/decoding and modulation/demodulation. Accordingly, the REC 5A includes the PDCP unit 110 and the RLC unit 111, and the RE 5B includes the MAC unit 112 and a BB-PHY unit 124.

In the configuration example shown in FIG. 7, the buffers 21A and 21B store the RLC PDUs which are obtained after processing of the RLC sublayer, i.e., a logical channel (e.g., DTCH (Dedicated Data channel)), for each mobile station.

When the scheduler 20A of the REC 5A is used for dynamic scheduling for mobile stations that connect the air interface to the RE 5B, the scheduler 20A supplies the control information for the dynamic scheduling to the RLC unit 111, the buffer 21A, the MAC unit 112, and the BB-PHY unit 124. On the other hand, when the scheduler 20B of the RE 5B is used for the dynamic scheduling, the scheduler 20B supplies the control information for the dynamic scheduling to the RLC unit 111, the buffer 21B, the MAC unit 112, and the BB-PHY unit 124. The selection of one of the schedulers 20A and 20B to be used may be performed in accordance with, for example, any one of the specific examples 1 to 9 as described in the first to fourth embodiments, or any combination thereof.

In the configuration example of FIG. 7, the BB-PHY unit 124 that performs channel coding/decoding is arranged in the RE 5B. The channel coding/decoding by the BB-PHY unit 124 is performed by using, for example, a coding algorithm such as turbo code, Viterbi code, or Reed-Solomon code. That is, the radio base station 5 performs channel coding/decoding in the RE 5B, regardless of which one of the schedulers 20A and 20B is used. Thus, the data stream that contains the user data and is transmitted through the transmission line 40 does not include redundant data generated as a result of channel coding (e.g., block coding, convolutional coding, or turbo coding). Accordingly, the data amount to be transmitted between the REC 5A and the RE 5B can be suppressed.

On the other hand, in the configuration example shown in FIG. 7, since the PDCP unit 110 and the RLC unit 111 are arranged in the REC 5A, the scheduler 20A may perform control for sending the RLC PDUs for each mobile station held in the buffer 21A, i.e., a logical channel (e.g., DTCH) for each mobile station, to an appropriate RE 5B. This facilitates the cooperative scheduling among the plurality of REs 5B.

In the configuration example shown in FIG. 7, the REC 5A and the RE 5B share the digital baseband signal processing. In other words, the radio base station 5 is capable of distributing the load of the digital baseband signal processing.

Figure 8A:
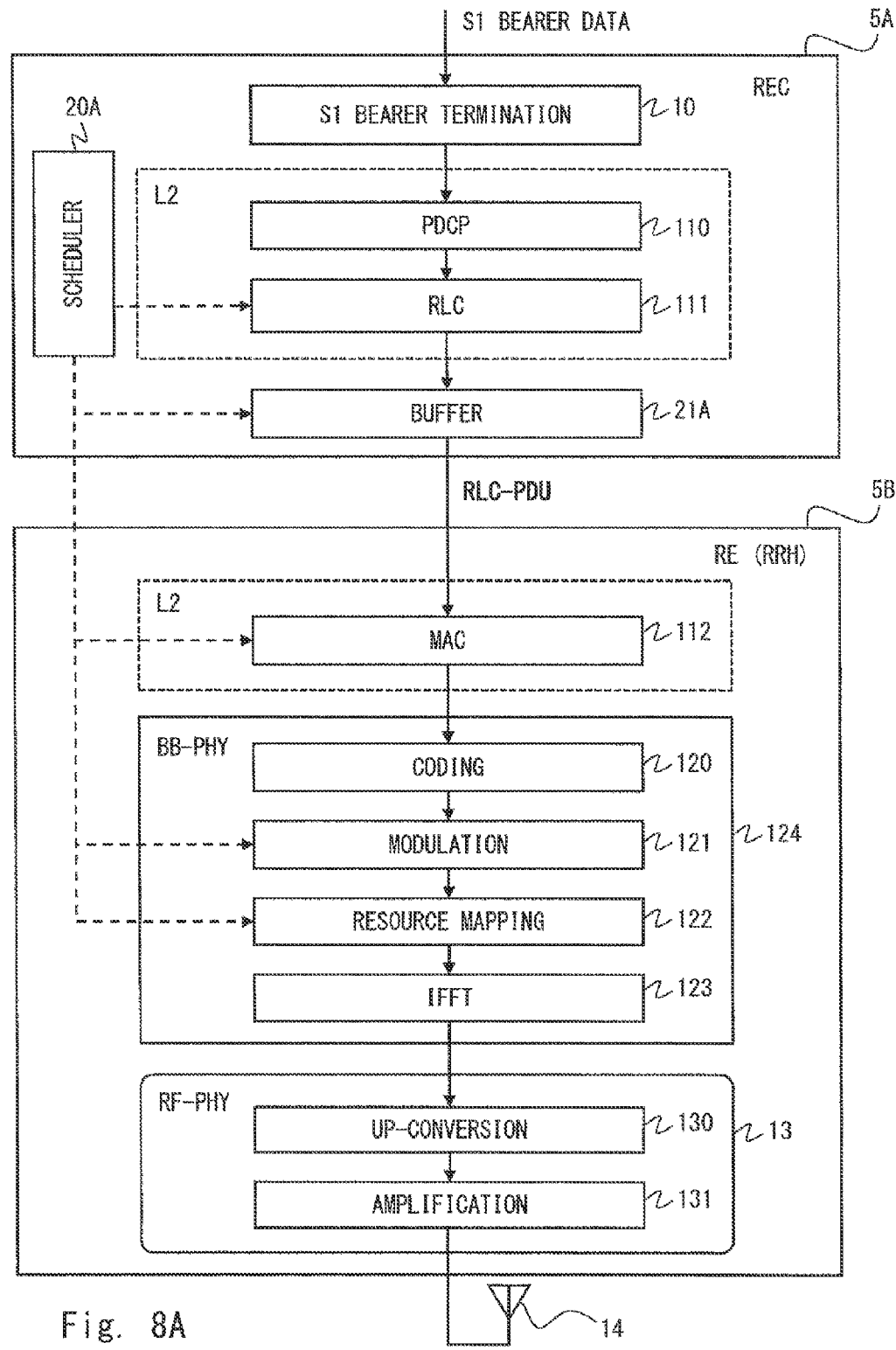
FIG. 8A is a diagram showing a protocol structure and a functional layout of the radio base station according to the fifth embodiment of the invention.
Figure 8B:
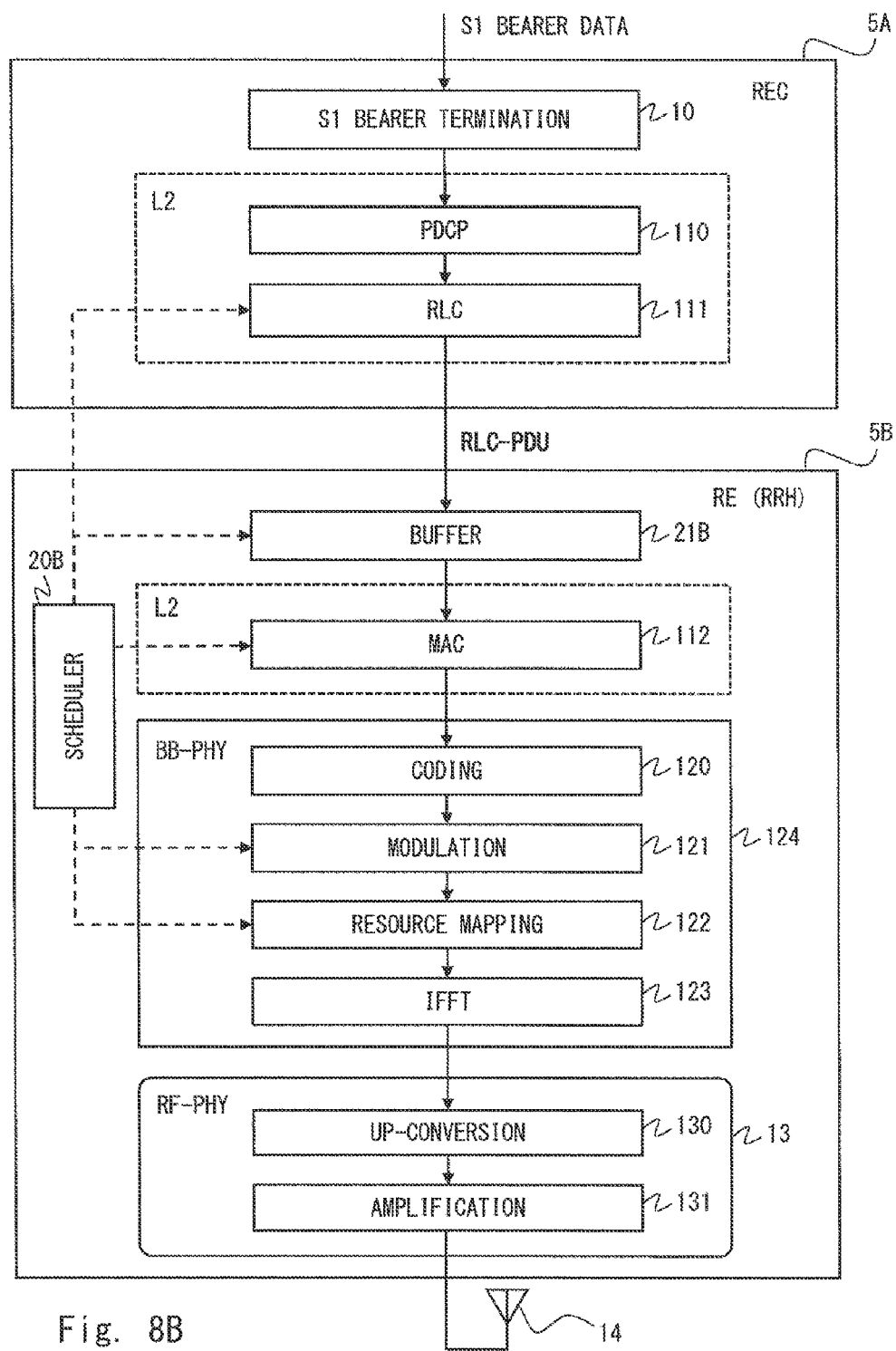
FIG. 8B is a diagram showing a protocol structure and a functional layout of the radio base station according to the fifth embodiment of the invention.

FIGS. 8A and 8B show the details of the functional layout in the radio base station 5 regarding the downlink transmission of user data in the E-UTRA. The functional layout shown in FIG. 8A corresponds to the case where the scheduler 20A of the REC 5A is used in the configuration example of FIG. 7. On the other hand, the functional layout shown in FIG. 8B corresponds to the case where the scheduler 20B of the RE 5B is used. In the example of FIG. 8A, the MAC-PDUs (i.e., a transport channel) are transferred from the REC 5A to the RE 5B. In the example of FIG. 8B, the user data obtained before the layer-2 processing is transferred from the REC 5A to the RE 5B.

Sixth Embodiment

Figure 9:
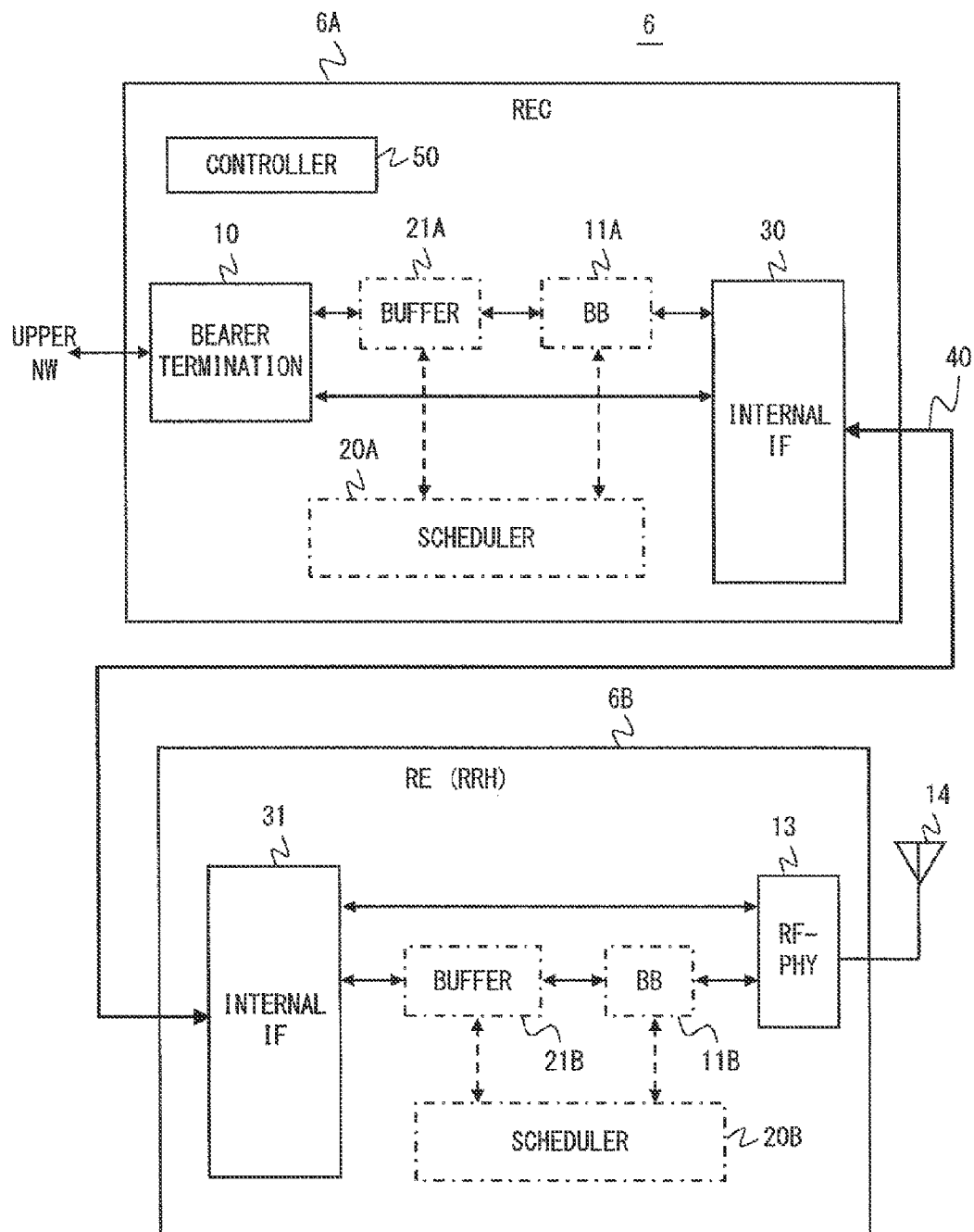
FIG. 9 is a block diagram showing a configuration example of a radio base station according to a sixth embodiment of the invention.

FIG. 9 is a block diagram showing a configuration example of a radio base station 6 according to this embodiment. The radio base station 6 includes a first part, i.e., a radio equipment controller (REC) 6A, and at least one second part, i.e., a radio equipment (RE) 6B. The REC 6A includes the buffer 21A and a BB unit 11A. The RE 6B includes the buffer 21B and a BB unit 11B. Though only one RE 6B is illustrated in FIG. 9, a plurality of REs 6B may be connected to the REC 6A.

The BB unit 11B can perform, instead of the BB unit 11A, the digital baseband signal processing for mobile stations that connect the air interface to the RE 6B. The radio base station 6 alternatively uses one of the BB units 11A and 11B in accordance with the selection of one of the schedulers 20A and 20B to be used. Specifically, the radio base station 6 uses the buffer 21A and the BB unit 11A, which are arranged in the REC 6A, when the scheduler 20A is used for dynamic scheduling for mobile stations that connect the air interface to the RE 6B. On the other hand, the radio base station 6 uses the buffer 21B and the BB unit 11B, which are arranged in the RE 6B, when the scheduler 20B is used for the dynamic scheduling.

The selection of one of the BB units 11A and 11B to be used may be performed by the controller 50 arranged in the radio base station 6, or may be performed by an external device such as a resource control apparatus or an OAM system. Alternatively, the selection may be performed in accordance with, for example, any one of the specific examples 1 to 9 as described in the first to fifth embodiments, or any combination thereof.

When the radio base station 6 requires, for example, the cooperative transmission and reception (e.g., CoMP) between a plurality of REs 6B and one mobile station, the first scheduler 20A, the buffer 21A, and the BB unit 11A of the REC 6A may be used for the dynamic scheduling. Therefore, the REC 6A can control the radio resources in a centralized manner for the plurality of REs 6B, thereby making it possible to relatively easily perform the cooperative transmission and reception (e.g., CoMP).

On the other hand, when there is no need to perform the cooperative transmission/reception (e.g., CoMP) between one mobile station and a plurality of REs 6B, the radio base station 6 may use the scheduler 20B, the buffer 21B, and the BB unit 11B of each RE 6B. This leads to a reduction in the amount of traffic between the REC and the RRH. This also contributes to a reduction in power consumption of the REC 6A.

Figure 10A:
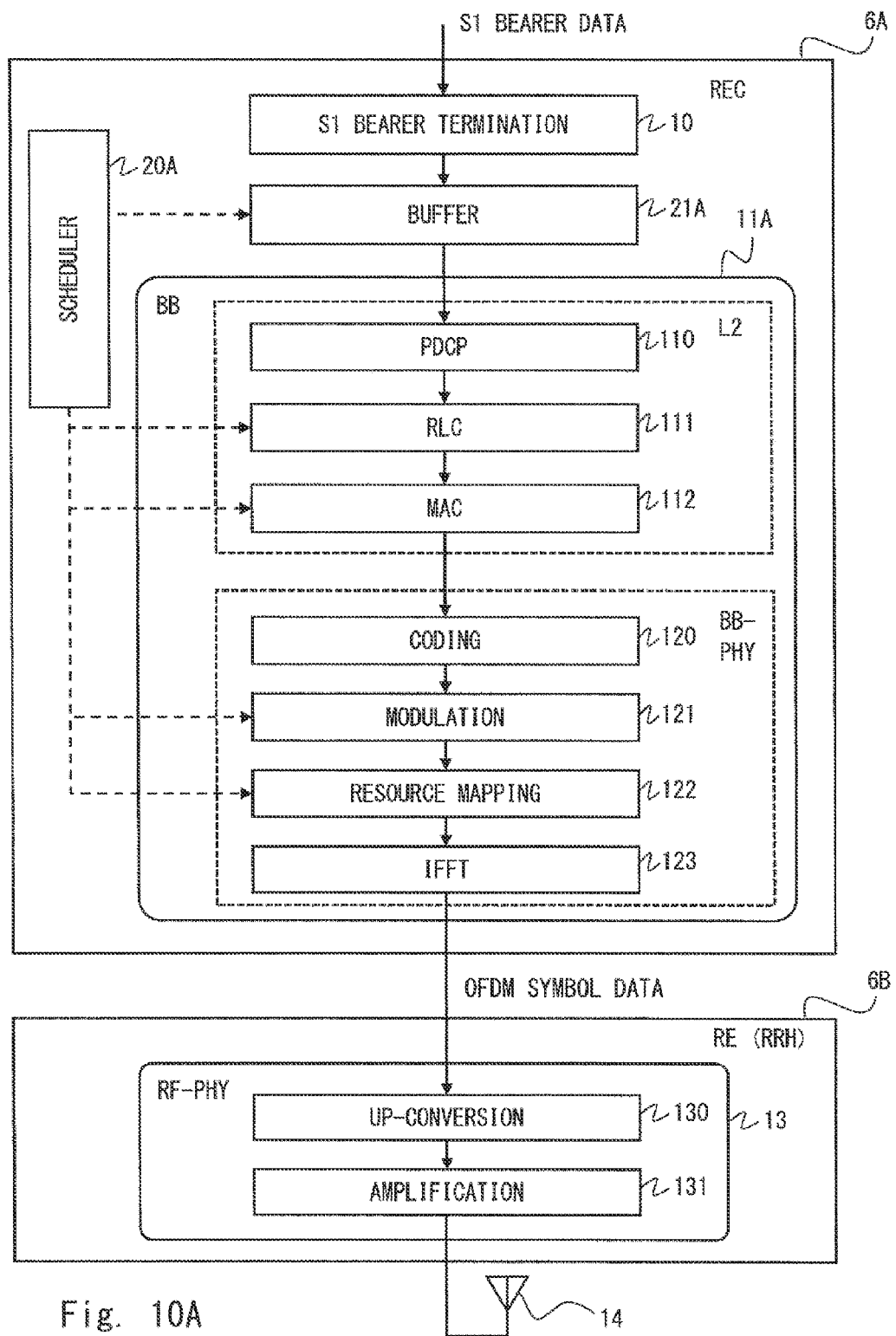
FIG. 10A is a diagram showing a protocol structure and a functional layout of the radio base station according to the sixth embodiment of the invention.
Figure 10B:
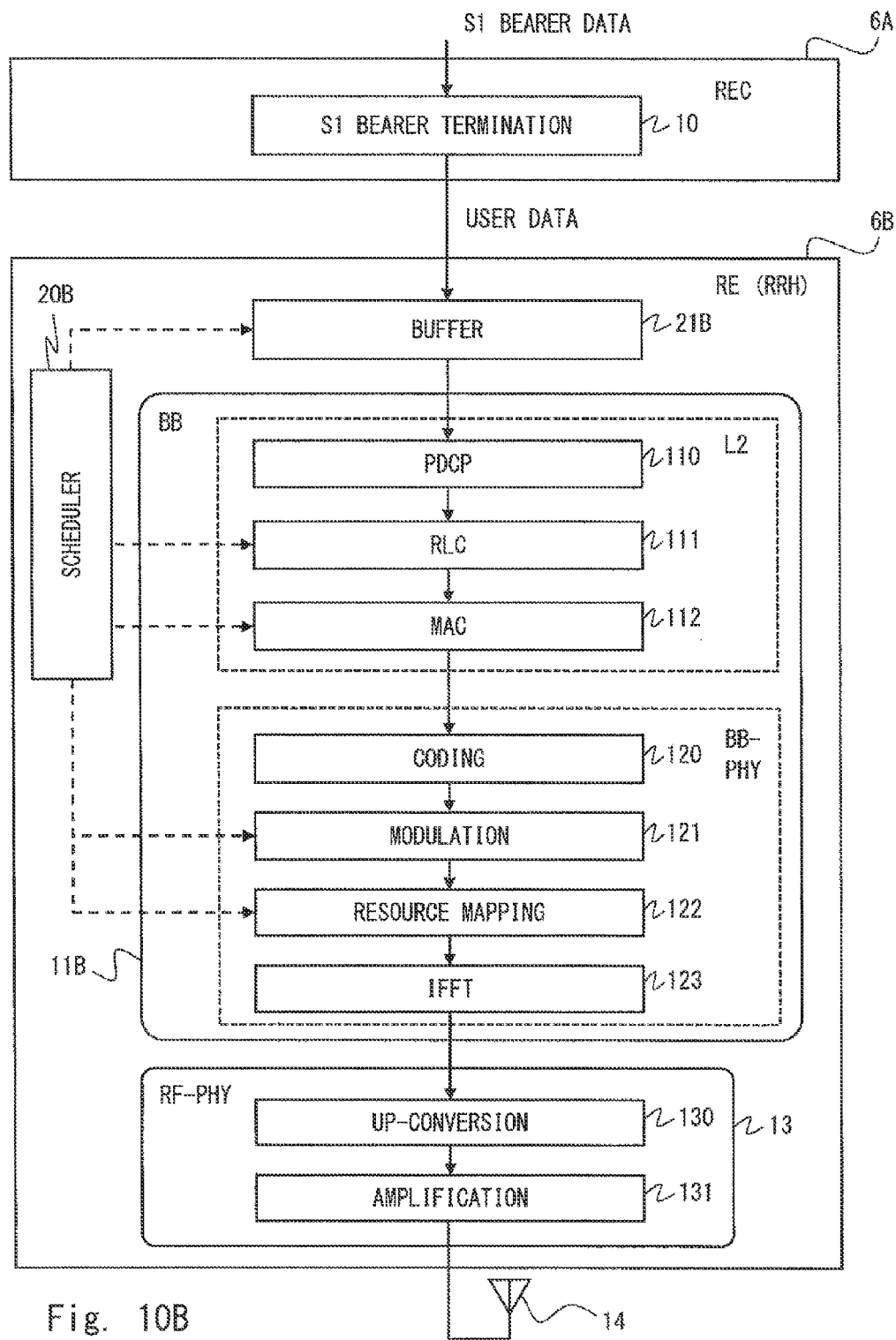
FIG. 10B is a diagram showing a protocol structure and a functional layout of the radio base station according to the sixth embodiment of the invention.

FIGS. 10A and 10B show the details of the functional layout in the radio base station 6 regarding the downlink transmission of user data in the E-UTRA. The functional layout shown in FIG. 10A corresponds to the case where the scheduler 20A, the buffer 21A, and the BB unit 11A of the REC 6A are used in the configuration example shown in FIG. 9. On the other hand, the functional layout shown in FIG. 10B corresponds to the case where the scheduler 20B, the buffer 21B, and the BB unit 11B of the RE 6B are used. In the example of FIG. 10A, the OFDM symbol data (baseband OFDM signal) is transferred from the REC 6A to the RE 6B. In the example of FIG. 10B, the user data is transferred from the REC 6A to the RE 6B.

Seventh Embodiment

The sixth embodiment illustrates an example in which the BB units 11A and 11B are arranged in the REC 6A and the RE 6B, respectively. However, the digital baseband processing functions, which are arranged in the REC and the RE, and one of which is alternatively used, may be a part of the layer-2 and physical layer digital signal processing to be performed on user data. This embodiment illustrates an example in which the layer-2 signal processing (L2) is allocated to both the REC and the RE, and the physical layer digital signal processing (BB-PHY) is allocated to only the RE.

Figure 11:
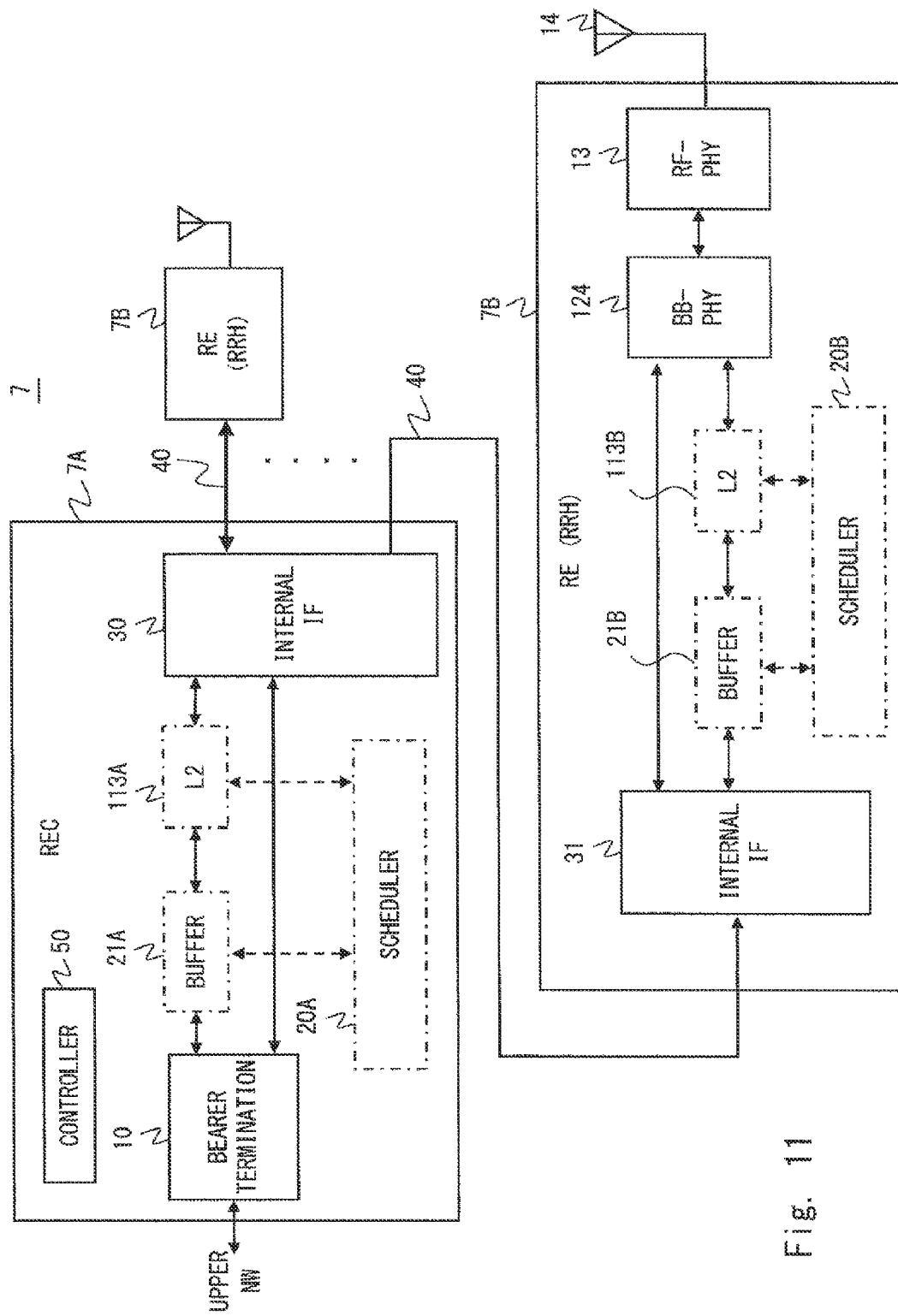
FIG. 11 is a block diagram showing a configuration example of a radio base station according to a seventh embodiment of the invention.

FIG. 11 is a block diagram showing a configuration example of a radio base station 7 according to this embodiment. The radio base station 7 includes a first part, i.e., a radio equipment controller (REC) 7A, and a second part, i.e., a radio equipment (RE) 7B. In the configuration example of FIG. 11, the REC 7A and the RE 7B include a layer-2 unit 113A and a layer-2 unit 113B, respectively. The RE 7B further includes the BB-PHY unit 124.

The layer-2 units 113A and 113B can perform the layer-2 signal processing except for dynamic scheduling. The layer-2 signal processing includes at least one of (i) data compression/de-compression, (ii) data encryption, (iii) addition/removal of a layer-2 header, data segmentation/concatenation, and (v) composition/decomposition of a transfer format by data multiplexing/de-multiplexing. In the case of E-UTRA, as a specific example, the layer-2 signal processing includes processing of the RLC sublayer and the MAC sublayer. The E-UTRA further includes a PDCP sublayer as an upper sublayer of the RLC sublayer. However, processing (e.g., IP header compression, encryption) in the PDCP sublayer is not essential and may be omitted.

The BB-PHY unit 124 is selectively coupled to the layer-2 unit 113A or 113B. Specifically, the BB-PHY unit 124 receives, from the layer-2 unit 113A or 113B, a data stream (e.g., MAC PDUs, a transport channel) obtained after the layer-2 processing, and generates modulation symbol data (or OFDM symbol data). Further, the BB-PHY unit 124 receives the baseband reception signal stream from the RF-PHY unit 13, generates an uplink data stream (e.g., MAC PDUs, a transport channel), and supplies this to the layer-2 unit 113A or 113B.

The layer-2 unit 113B can perform, instead of the layer-2 unit 113A, the layer-2 signal processing for mobile stations that connect the air interface to the RE 7B. The radio base station 6 alternatively uses one of the layer-2 units 113A and 113B in accordance with the selection of one of the schedulers 20A and 20B to be used. Specifically, the radio base station 7 uses the buffer 21A and the layer-2 unit 113A, which are arranged in the REC 7A, when the scheduler 20A is used for dynamic scheduling for mobile stations that connect the air interface to the RE 7B. On the other hand, the radio base station 7 uses the buffer 21B and the layer-2 unit 113B, which are arranged in the RE 7B, when the scheduler 20B is used for the dynamic scheduling.

The selection of one of the layer-2 units 113A and 113B to be used may be performed by the controller 50 arranged in the radio base station 7, or may be performed by an external device such as a resource control apparatus or an OAM system. The selection may be performed in accordance with, for example, any one of the specific examples 1 to 9 as described in the first to fifth embodiments, or any combination thereof.

As described above, the radio base station 7 according to this embodiment is configured to select one of the layer-2 units 113A and 113B to be used. Accordingly, the radio base station 7 can select which one of the REC 7A and the RE 7B is used to perform the layer-2 signal processing depending on the need to be preferentially met among the plurality of needs, such as the need for reducing the processing load of the REC 7A, and the need for achieving the cooperative control among the plurality of REs 7B.

When the layer-2 unit 113A of the REC 7A is used, the radio base station 7 can relatively easily perform the cooperative transmission/reception (e.g., CoMP) for the plurality of REs 7B. This is because the scheduler 20A only needs to control the layer-2 unit 113A, which is arranged in the REC 7A, upon execution of dynamic scheduling. Further, the radio base station 7 can share the layer-2 unit 113A, which is arranged in the REC 7A, for processing of user data pertaining to the plurality of REs 7B. Accordingly, the radio base station 7 can effectively use the layer-2 unit 113A. Furthermore, even when the layer-2 unit 113A of the REC 7A is used, the data stream that contains the user data and is transmitted through the transmission line 40 does not include redundant data generated as a result of channel coding (e.g., block coding, convolutional coding, or turbo coding). This is because the BB-PHY unit 124 that performs channel coding/decoding is arranged in the RE 7B. Accordingly, the radio base station 7 can suppress the data amount to be transmitted between the REC 7A and the RE 7B, regardless of which one of the layer-2 units 113A and 113B is used.

Figure 12A:
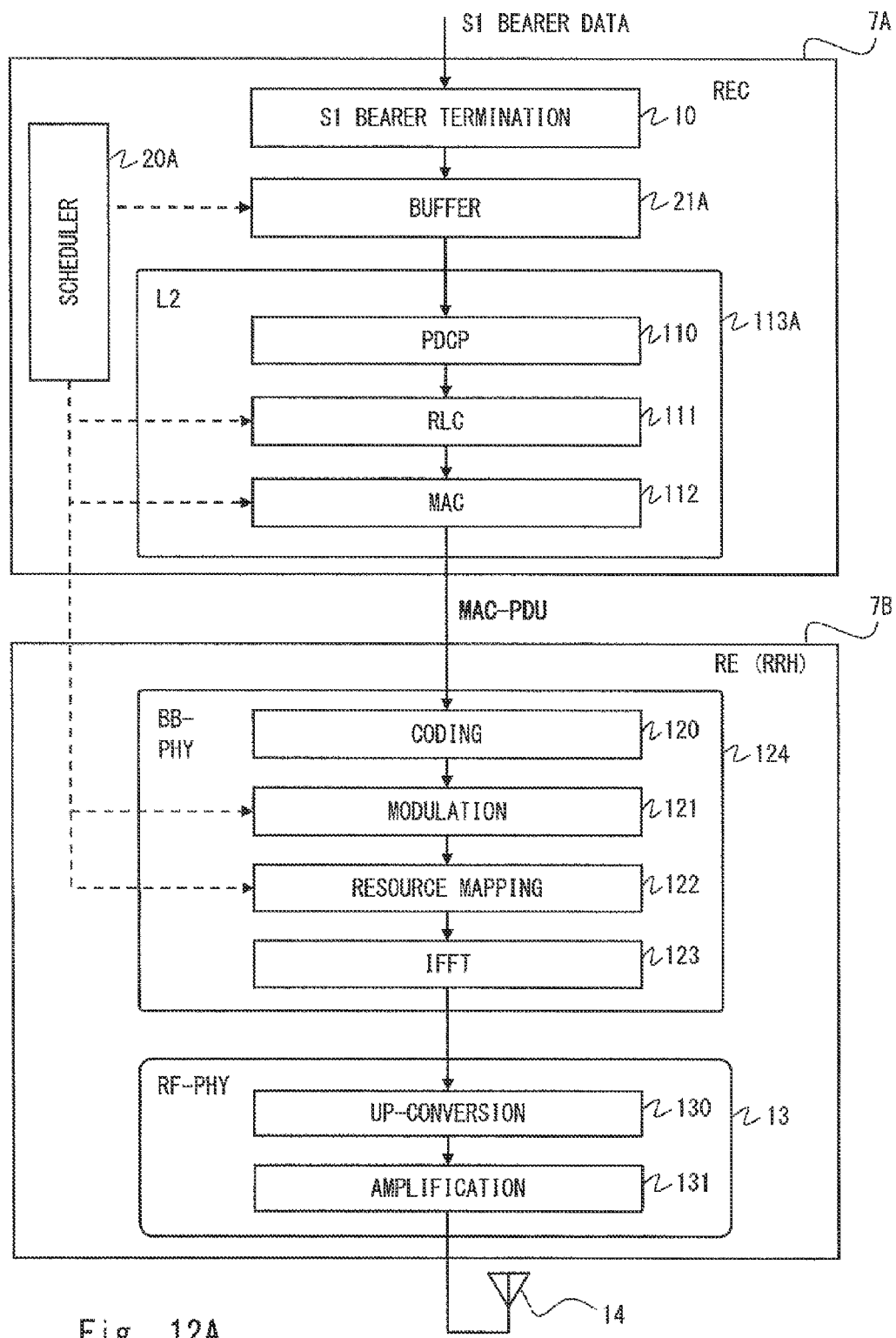
FIG. 12A is a diagram showing a protocol structure and a functional layout of the radio base station according to the seventh embodiment of the invention.
Figure 12B:
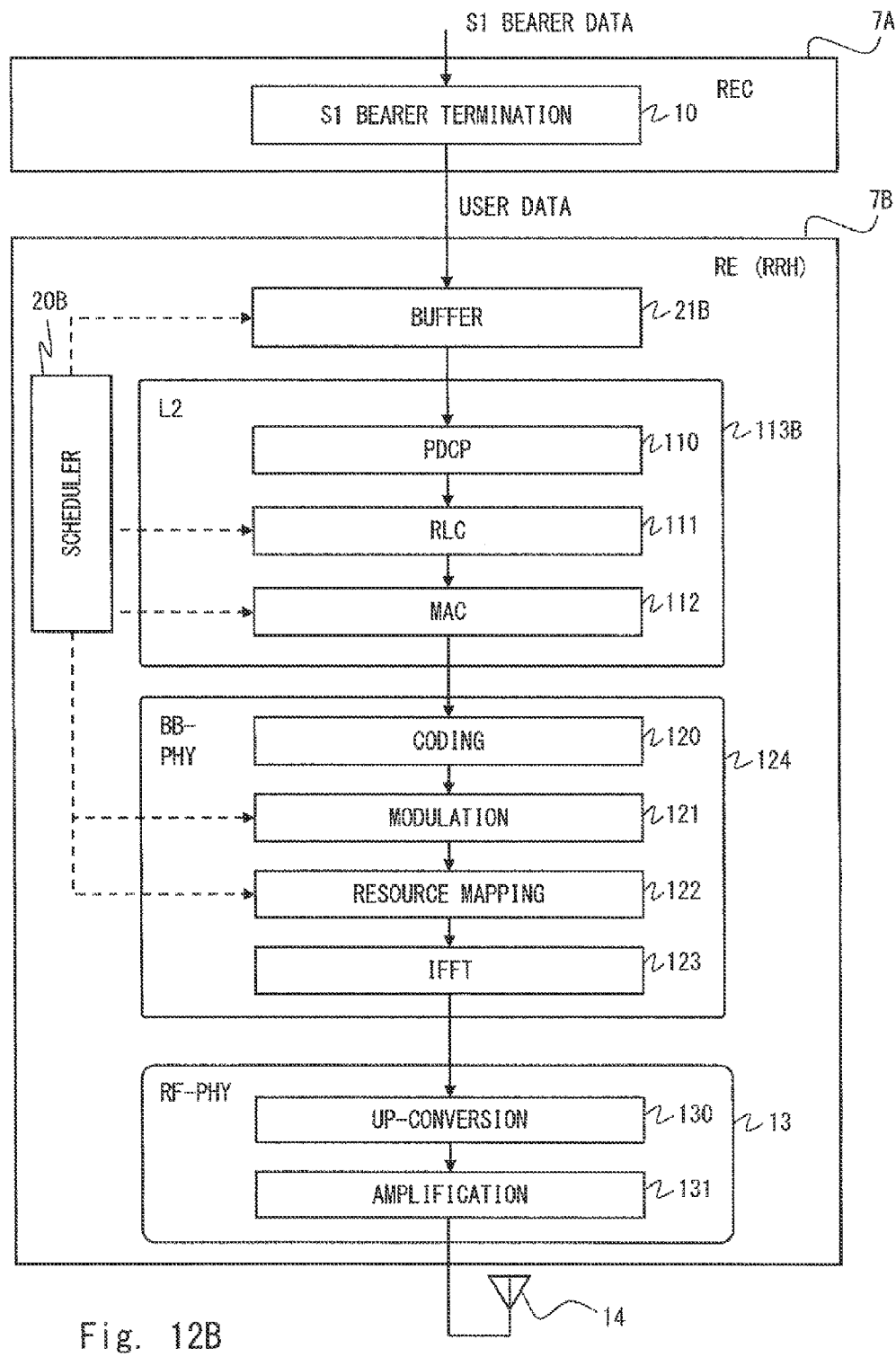
FIG. 12B is a diagram showing a protocol structure and a functional layout of the radio base station according to the seventh embodiment of the invention.

FIGS. 12A and 12B show the details of the functional layout in the radio base station 7 regarding the downlink transmission of user data in the E-UTRA. The functional layout shown in FIG. 12A corresponds to the case where the layer-2 unit 113A of the REC 7A is used in the configuration example of FIG. 11. On the other hand, the functional layout shown in FIG. 12B corresponds to the case where the layer-2 unit 113B of the RE 7B is used. In the example of FIG. 12A, the MAC-PDUs (i.e., a transport channel) are transferred from the REC 7A to the RE 7B. In the example of FIG. 12B, the user data obtained before the layer-2 processing is transferred from the REC 7A to the RE 7B.

Eighth Embodiment

As described in the first embodiment, the dynamic scheduling performed by the scheduler 20B instead of the scheduler 20A may be a part of the dynamic scheduling for mobile stations connected to the RE 1B. In this case, the scheduler 20B operates in a cooperative manner with the scheduler 20A for the dynamic scheduling for mobile stations connected to the RE 1B. A radio base station 8 according to this embodiment may have a configuration similar to that of any one of the radio base stations 1 to 7 described above. Specifically, the radio base station 8 includes an REC 8A and an RE 8B. The selection of one of the schedulers 20A and 20B to be used may be performed in accordance with, for example, any one of the specific examples 1 to 9 as described in the first to seventh embodiments, or any combination thereof. Specific examples of dividing the functions between the scheduler 20A and the scheduler 20B will be described below.

In a first example, the scheduler 20B calculates a parameter used for dynamic scheduling based on the radio communication quality of the air interface, and sends the parameter to the scheduler 20A. The main scheduling techniques, such as PF scheduling and Max-C/I scheduling, use the radio communication quality of the air interface. For example, PF scheduling uses, as a parameter, a ratio between an instantaneous predicted radio communication quality and a previous average radio communication quality of a mobile station so as to secure the fairness of transmission opportunities among mobile stations. This parameter is called a PF metric. Examples of the radio communication quality used for calculation of the PF metric include a data rate and a signal-to-interference ratio (SINR). The PF metric is calculated as, for example, a ratio between an instantaneous SINR and an average SINR (i.e., instantaneous SINR/average SINR).

The scheduler 20B calculates a parameter, such as the PF metric, using the radio communication quality, thereby reducing the processing load of the scheduler 20A. Further, the data amount to be transmitted from the RE 5B to the REC 5A via the transmission line 40 can be reduced. In the case of calculating a parameter (e.g., PF metric) in the REC 5A, it is necessary to send the measurement results of the current and previous radio communication qualities from the RE 8B to the REC 8A. However, when the scheduler 20B calculates a parameter, only the calculated parameter may be sent instead of the measurement results of the current and previous radio communication qualities.

Figure 13:
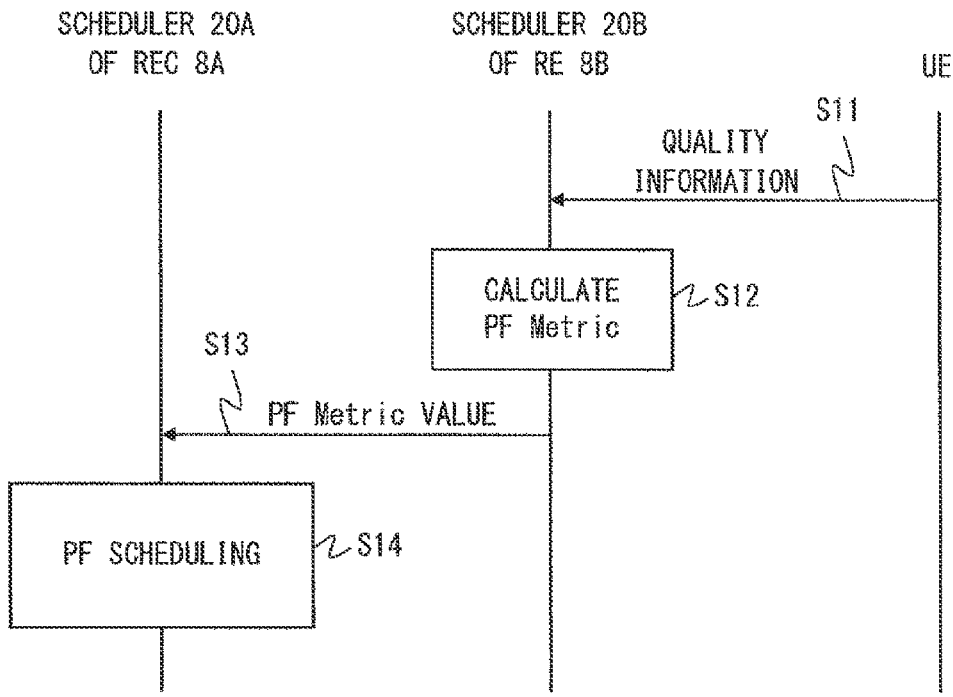
FIG. 13 is a sequence diagram showing an operation example of a scheduler according to an eighth embodiment of the invention.

FIG. 13 is a sequence diagram showing operations of the schedulers 20A and 20B when the scheduler 20B calculates the PF metric. In step S11, a mobile station (UE) sends quality information. This quality information indicates the downlink radio communication quality measured by the mobile station. In step S12, the scheduler 20B calculates the PF metric by using the quality information received from the mobile station. In step S13, the scheduler 20B sends the PF metric to the scheduler 20A. In step S14, the scheduler 20A executes dynamic scheduling by using the PF metric received from the scheduler 20B, and determines mobile stations or user data to be allocated to downlink radio resources.

Next, a second example of dividing the functions between the scheduler 20A and the scheduler 20B will be described. In the second example, the scheduler 20B executes scheduling for H-ARQ re-transmission or scheduling for re-transmission of the RLC sublayer. Specifically, the scheduler 20B buffers the downlink transmitted data, and when the mobile station requests re-transmission, the scheduler 20B performs re-transmission based on a re-transmission instruction from the scheduler 20A. For example, the scheduler 20B may allocate, for the re-transmission, the same radio resource as used for the transmission immediately before. This contributes to a reduction in the processing load of the scheduler 20A. Further, since there is no need to transfer the re-transmitted data from the REC 5A to the RE 5B, the data amount to be transmitted via the transmission line 40 can be reduced.

Figure 14:
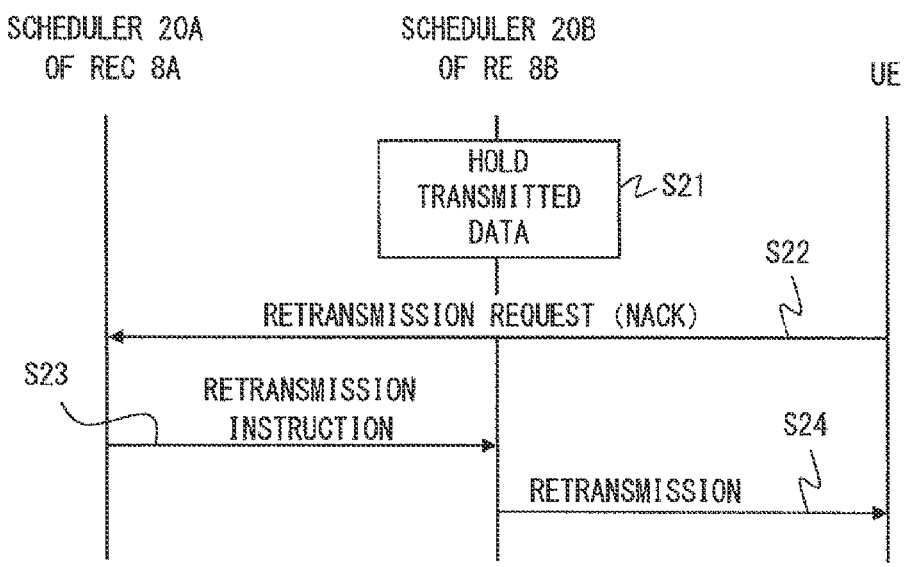
FIG. 14 is a sequence diagram showing an operation example of the scheduler according to the eighth embodiment of the invention.

FIG. 14 is a sequence diagram showing operations of the schedulers 20A and 20B when the scheduler 20B controls re-transmission. In step S21, the scheduler 20B buffers the downlink transmitted data. In step S22, the mobile station sends a re-transmission request (e.g., NACK), and the scheduler 20A receives the re-transmission request. In step S23, the scheduler 20A instructs the scheduler 20B to perform re-transmission. In step S24, the scheduler 20B performs re-transmission according to the instruction from the scheduler 20A.

Other Embodiments

The radio base stations 1 to 7 respectively described in the first to seventh embodiments may be relay stations. The relay station establishes a first radio link (a backhaul link) with a base station and establishes a second radio link (an access link) with a mobile station, thereby relaying data between the base station and the mobile station.

The bearer termination units, the BB units, the layer-2 units, the BB-PHY units, and the schedulers, which are described in the first to eighth embodiments, may be implemented by using a semiconductor processing device including, for example, an ASIC (Application Specific Integrated Circuit) and a DSP (Digital Signal Processor). These units may be implemented by causing a computer, such as a microprocessor, to execute a program.

This program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line, such as electric wires and optical fibers, or a radio communication line.

The first to eighth embodiments can be combined as appropriate. Furthermore, the present invention is not limited to the embodiments described above, and can be modified in various manners without departing from the gist of the invention described above.

This application is based upon and claims the benefit of priority from Japanese patent application No. 2011-257478, filed on Nov. 25, 2011, the disclosure of which is incorporated herein in its entirety by reference.

REFERENCE SIGNS LIST 1-8 RADIO BASE STATIONS
1A-7A RADIO EQUIPMENT CONTROLLERS (REC)
1B-7B RADIO EQUIPMENT (RE)
10, 10A, 10B BEARER TERMINATION UNITS 11, 11A, 11B BB UNITS
13 RF-PHY UNIT
14 ANTENNA
20A, 20B SCHEDULERS
21A, 21B BUFFERS
30, 31 INTERNAL INTERFACES
40 TRANSMISSION LINE
50 CONTROLLER
51 HANDOVER CONTROL UNIT
110 PDCP UNIT
111 RLC UNIT
112 MAC UNIT
113A, 113B LAYER-2 UNITS
120 CODING UNIT
121 MODULATION UNIT
122 RESOURCE MAPPING UNIT
123 IFFT UNIT
124, 124A, 124B BB-PHY UNITS
130 UP-CONVERTER
131 AMPLIFIER

The invention claimed is:

1. A radio station that is used in a radio communication network and is capable of transmitting and receiving user data including downlink user data and uplink user data to and from a plurality of mobile stations via an air interface, the radio station comprising:
a first part; and
a second part that can be arranged so as to be physically separated from the first part and is connected to the first part via a transmission line so as to be able to communicate with the first part, wherein
the first part comprises a first scheduling unit capable of performing dynamic scheduling to allocate a plurality of radio resources to the plurality of mobile stations or the user data,
the second part comprises:
an analog signal processing unit configured to perform analog signal processing including at least one of frequency conversion and power amplification to provide an air interface to a first mobile station connected to the second part among the plurality of mobile stations; and
a second scheduling unit capable of performing, instead of the first scheduling unit, at least a part of dynamic scheduling for the first mobile station, and
the radio station is configured to alternatively use one of the first and second scheduling units for the at least a part of the dynamic scheduling for the first mobile station,
wherein one of the first and second scheduling units to be used is selected based on a status of occurrence of re-transmission in the air interface.

2. The radio station according to claim 1, wherein when the number of occurrences or an occurrence rate of re-transmission in the first mobile station or in the second part exceeds a predetermined level, the second scheduling unit is selected for the dynamic scheduling for the first mobile station.

3. A radio station that is used in a radio communication network and is capable of transmitting and receiving user data including downlink user data and uplink user data to and from a plurality of mobile stations via an air interface, the radio station comprising:
a first part; and
a second part that can be arranged so as to be physically separated from the first part and is connected to the first part via a transmission line so as to be able to communicate with the first part, wherein
the first part comprises a first scheduling unit capable of performing dynamic scheduling to allocate a plurality of radio resources to the plurality of mobile stations or the user data,
the second part comprises:
an analog signal processing unit configured to perform analog signal processing including at least one of frequency conversion and power amplification to provide an air interface to a first mobile station connected to the second part among the plurality of mobile stations; and
a second scheduling unit capable of performing, instead of the first scheduling unit, at least a part of dynamic scheduling for the first mobile station, and
the radio station is configured to alternatively use one of the first and second scheduling units for the at least a part of the dynamic scheduling for the first mobile station,
wherein one of the first and second scheduling units to be used is selected based on a power supply status with respect to the first part.

4. The radio station according to claim 3, wherein the power supply status includes a charging status of a battery that supplies power to the first part.

5. A radio station that is used in a radio communication network and is capable of transmitting and receiving user data including downlink user data and uplink user data to and from a plurality of mobile stations via an air interface, the radio station comprising:
a first part; and
a second part that can be arranged so as to be physically separated from the first part and is connected to the first part via a transmission line so as to be able to communicate with the first part, wherein
the first part comprises a first scheduling unit capable of performing dynamic scheduling to allocate a plurality of radio resources to the plurality of mobile stations or the user data,
the second part comprises:
an analog signal processing unit configured to perform analog signal processing including at least one of frequency conversion and power amplification to provide an air interface to a first mobile station connected to the second part among the plurality of mobile stations; and
a second scheduling unit capable of performing, instead of the first scheduling unit, at least a part of dynamic scheduling for the first mobile station, and
the radio station is configured to alternatively use one of the first and second scheduling units for the at least a part of the dynamic scheduling for the first mobile station,
wherein one of the first and second scheduling units to be used is selected based on a power supply status with respect to the second part.

6. The radio station according to claim 5, wherein the power supply status includes availability of self-generation of a power supply unit for supplying power to the second part.

7. The radio station according to claim 1, further comprising a control unit configured to determine which one of the first and second scheduling units is used for performing dynamic scheduling for the first mobile station.

8. The radio station according to claim 1, wherein the radio station determines which one of the first and second scheduling units is used for performing dynamic scheduling for the first mobile station, based on an instruction from an external device.

9. A radio station that is used in a radio communication network and is capable of transmitting and receiving user data including downlink user data and uplink user data to and from a plurality of mobile stations via an air interface, the radio station comprising:

a first part; and a second part that can be arranged so as to be physically separated from the first part and is connected to the first part via a transmission line so as to be able to communicate with the first part, wherein the first part comprises a first scheduling unit capable of performing dynamic scheduling to allocate a plurality of radio resources to the plurality of mobile stations or the user data, the second part comprises:

an analog signal processing unit configured to perform analog signal processing including at least one of frequency conversion and power amplification to provide an air interface to a first mobile station connected to the second part among the plurality of mobile stations; and a second scheduling unit capable of performing, instead of the first scheduling unit, at least a part of dynamic scheduling for the first mobile station, and the radio station is configured to alternatively use one of the first and second scheduling units for the at least a part of the dynamic scheduling for the first mobile station, wherein the first part further comprises a first digital signal processing unit capable of performing digital signal processing for transmitting the downlink user data to the air interface and for restoring the uplink user data from a signal received from the air interface, the second part further comprises a second digital signal processing unit capable of performing, instead of the first digital signal processing unit, digital signal processing for the first mobile station, and one of the first and second digital signal processing units to be used is determined in accordance with a selection of one of the first and second scheduling units to be used.

10. The radio station according to claim 9, wherein the digital signal processing includes at least one of: (i) addition of a layer-2 header; (ii) data segmentation/concatenation; (iii) composition of a transfer format by data multiplexing; (iv) channel coding; and (v) modulation, so as to transmit the downlink user data to the air interface, and the digital signal processing includes at least one of: (i) demodulation; (ii) channel decoding; (iii) decomposition of a transfer format; (iv) de-segmentation/de-concatenation; and (v) removal of a layer-2 header, so as to restore the uplink user data from the signal received from the air interface.

11. A method of processing user data performed by a radio station, the radio station being used in a radio communication network and configured to transmit and receive user data including downlink user data and uplink user data to and from a plurality of mobile stations via an air interface, the radio station including a first part and at least one second part that can be arranged so as to be physically separated from the first part and is connected to the first part via a transmission line so as to be able to communicate with the first part, the first part including a first scheduling unit capable of performing dynamic scheduling to allocate a plurality of radio resources to the plurality of mobile stations or the user data, the second part including a second scheduling unit capable of performing, instead of the first scheduling unit, at least a part of dynamic scheduling for a first mobile station connected to the second part, the processing method comprising alternatively using one of the first and second scheduling units for the at least a part of the dynamic scheduling for the first mobile station, wherein the alternative using includes selecting one of the first and second scheduling units to be used, based on a status of occurrence of re-transmission in the air interface.

12. The method according to claim 11, wherein the selecting includes selecting the second scheduling unit for performing the dynamic scheduling for the first mobile station when the number of occurrences or an occurrence rate of re-transmission in the first mobile station or in the second part exceeds a predetermined level.

13. A method of processing user data performed by a radio station, the radio station being used in a radio communication network and configured to transmit and receive user data including downlink user data and uplink user data to and from a plurality of mobile stations via an air interface, the radio station including a first part and at least one second part that can be arranged so as to be physically separated from the first part and is connected to the first part via a transmission line so as to be able to communicate with the first part, the first part including a first scheduling unit capable of performing dynamic scheduling to allocate a plurality of radio resources to the plurality of mobile stations or the user data, the second part including a second scheduling unit capable of performing, instead of the first scheduling unit, at least a part of dynamic scheduling for a first mobile station connected to the second part, the processing method comprising alternatively using one of the first and second scheduling units for the at least a part of the dynamic scheduling for the first mobile station, wherein the alternative using includes selecting one of the first and second scheduling units to be used, based on a power supply status with respect to the first part.

14. The method according to claim 13, wherein the power supply status includes a charging status of a battery that supplies power to the first part.

15. A method of processing user data performed by a radio station, the radio station being used in a radio communication network and configured to transmit and receive user data including downlink user data and uplink user data to and from a plurality of mobile stations via an air interface, the radio station including a first part and at least one second part that can be arranged so as to be physically separated from the first part and is connected to the first part via a transmission line so as to be able to communicate with the first part, the first part including a first scheduling unit capable of performing dynamic scheduling to allocate a plurality of radio resources to the plurality of mobile stations or the user data, the second part including a second scheduling unit capable of performing, instead of the first scheduling unit, at least a part of dynamic scheduling for a first mobile station connected to the second part, the processing method comprising alternatively using one of the first and second scheduling units for the at least a part of the dynamic scheduling for the first mobile station, wherein the alternative using includes selecting one of the first and second scheduling units to be used, based on a power supply status with respect to the second part.

16. The method according to claim 15, wherein the power supply status includes availability of self-generation of a power supply unit configured to supply power to the second part.

17. A method of processing user data performed by a radio station, the radio station being used in a radio communication network and configured to transmit and receive user data including downlink user data and uplink user data to and from a plurality of mobile stations via an air interface, the radio station including a first part and at least one second part that can be arranged so as to be physically separated from the first part and is connected to the first part via a transmission line so as to be able to communicate with the first part, the first part including a first scheduling unit capable of performing dynamic scheduling to allocate a plurality of radio resources to the plurality of mobile stations or the user data, the second part including a second scheduling unit capable of performing, instead of the first scheduling unit, at least a part of dynamic scheduling for a first mobile station connected to the second part, the processing method comprising alternatively using one of the first and second scheduling units for the at least a part of the dynamic scheduling for the first mobile station, wherein the first part further includes a first digital signal processing unit capable of performing digital signal processing for transmitting the downlink user data to the air interface and for restoring the uplink user data from a signal received from the air interface, the second part further includes a second digital signal processing unit capable of performing, instead of the first digital signal processing unit, digital signal processing for the first mobile station in the digital signal processing, the method further comprises alternatively using one of the first and second digital signal processing units for the digital signal processing for the first mobile station, and one of the first and second digital signal processing units to be used is determined in accordance with a selection of one of the first and second scheduling units to be used.

18. The method according to claim 17, wherein:

the digital signal processing for transmitting the downlink user data includes at least one of:
(i) addition of a layer-2 header;
(ii) data segmentation/concatenation;
(iii) composition of a transfer format by data multiplexing;
(iv) channel coding; and
(v) modulation, so as to transmit the downlink user data to the air interface, and the digital signal processing for restoring the uplink data includes at least one of:
(i) demodulation;
(ii) channel decoding;
(iii) decomposition of a transfer format;
(iv) de-segmentation/de-concatenation; and
(v) removal of a layer-2 header, so as to restore the uplink user data from the signal received from the air interface.

\* \* \* \* \*